(12) United States Patent
Bonnat

(10) Patent No.: US 9,791,918 B2
(45) Date of Patent: Oct. 17, 2017

(54) BREATH-SENSITIVE DIGITAL INTERFACE

(76) Inventor: Pierre Bonnat, Grandville, MI (US)

(*) Notice: Subject to any disclaimer, the term of this patent is extended or adjusted under 35 U.S.C. 154(b) by 0 days.

(21) Appl. No.: 13/359,469

(22) Filed: Jan. 26, 2012

(65) Prior Publication Data

US 2012/0192121 A1 Jul. 26, 2012

Related U.S. Application Data

(63) Continuation-in-part of application No. 12/056,171, filed on Mar. 26, 2008.

(60) Provisional application No. 61/436,506, filed on Jan. 26, 2011.

(51) Int. Cl.
*G06F 3/00* (2006.01)
*G06F 3/01* (2006.01)
*G06F 3/0488* (2013.01)
*G09B 21/00* (2006.01)

(52) U.S. Cl.
CPC ............ *G06F 3/011* (2013.01); *G06F 3/0488* (2013.01); *G09B 21/00* (2013.01)

(58) Field of Classification Search
CPC ...... G06F 3/04815; G06F 3/033; G06F 3/011; G09B 21/00
USPC .......................................... 715/700, 771, 863
See application file for complete search history.

(56) References Cited

U.S. PATENT DOCUMENTS

| | | | | |
|---|---|---|---|---|
| 4,840,634 A * | 6/1989 | Muller et al. | .................... | 623/24 |
| 6,574,571 B1 * | 6/2003 | Bonnat | ........................... | 702/48 |
| 6,801,231 B1 * | 10/2004 | Beltz | .............................. | 715/865 |
| 6,874,123 B1 * | 3/2005 | DeStefano | ..................... | 715/234 |
| 7,159,181 B2 * | 1/2007 | Mansell et al. | ................ | 715/744 |
| 7,310,776 B2 * | 12/2007 | Mansell et al. | ................ | 715/744 |
| 8,013,837 B1 * | 9/2011 | Schroeder | ...................... | 345/157 |
| 2003/0023435 A1 * | 1/2003 | Josephson | ..................... | 704/235 |
| 2005/0207545 A1 * | 9/2005 | Gao et al. | ................... | 379/88.17 |
| 2006/0075360 A1 * | 4/2006 | Bixler | ........................... | 715/805 |
| 2007/0130522 A1 * | 6/2007 | Mansell et al. | ................ | 715/744 |
| 2008/0098306 A1 * | 4/2008 | Gao et al. | ....................... | 715/728 |
| 2008/0163379 A1 * | 7/2008 | Robinson et al. | .............. | 726/27 |
| 2009/0128498 A1 | 5/2009 | Hollemans | | |
| 2009/0241686 A1 | 10/2009 | Bonnat | | |
| 2009/0247222 A1 | 10/2009 | Bonnat | | |
| 2009/0249202 A1 * | 10/2009 | Bonnat | ......................... | 715/700 |
| 2011/0004327 A1 | 1/2011 | Bonnat | | |
| 2011/0029910 A1 * | 2/2011 | Thiessen | ........................ | 715/771 |
| 2011/0173539 A1 * | 7/2011 | Rottler et al. | ................. | 715/727 |
| 2011/0202859 A1 * | 8/2011 | Fong | .............................. | 715/769 |

OTHER PUBLICATIONS

PCT Notification of Transmittal of the International Search Report and the Written Opinion of the International Searching Authority, or the Declaration, in International application No. PCT/US2012/022802, dated May 29, 2012 (15 pages).

PCT Notification Concerning Transmittal of International Preliminary Report on Patentability, in International application No. PCT/US2012/022802, dated Aug. 8, 2013. (9 pages).

* cited by examiner

*Primary Examiner* — Stephen Hong
*Assistant Examiner* — Marshon Robinson
(74) *Attorney, Agent, or Firm* — McAndrews, Held & Malloy, Ltd.

(57) ABSTRACT

A breath-sensitive digital interface that enables use a person's breath or other fluid for purposes of navigating digital media, and method for using such an interface.

19 Claims, 17 Drawing Sheets

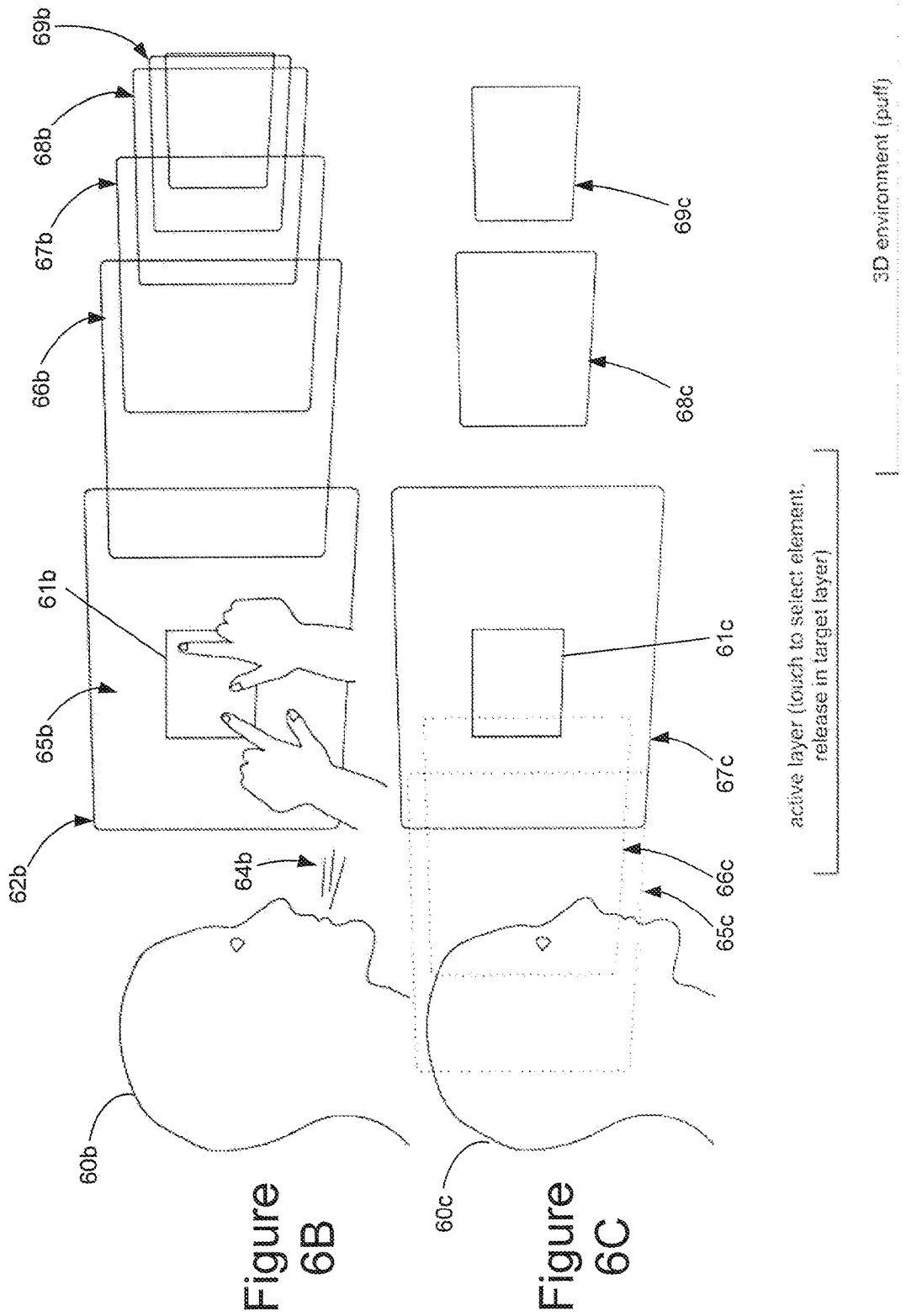

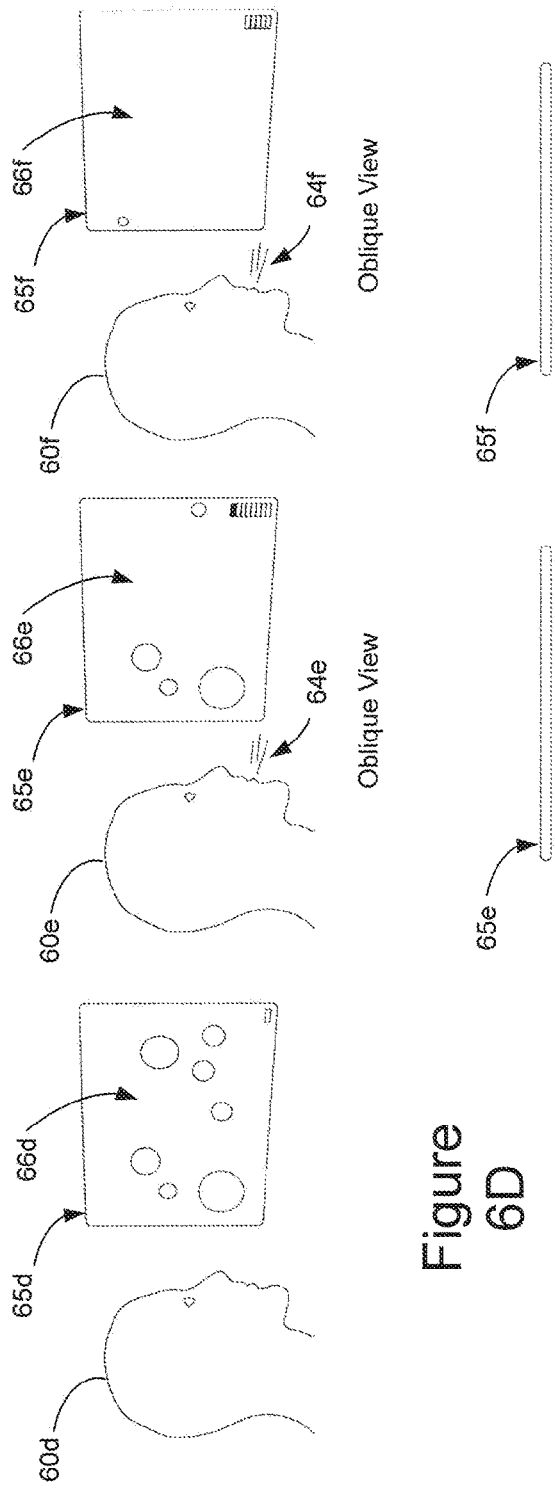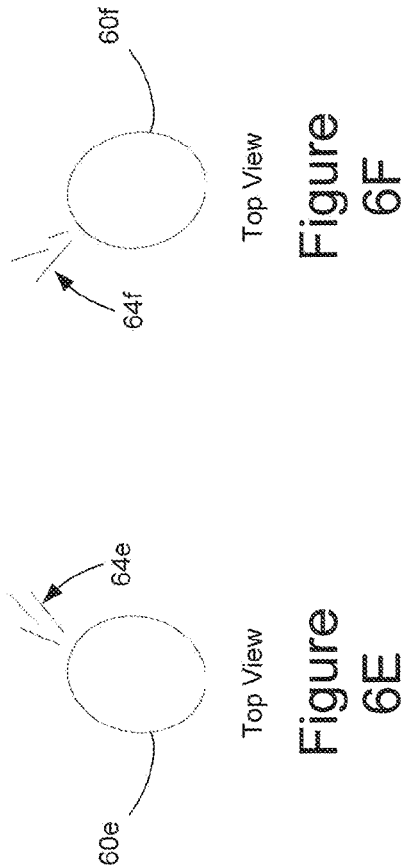

BREATH-SENSITIVE DIGITAL INTERFACE

CROSS-REFERENCE TO RELATED APPLICATIONS/INCORPORATION BY REFERENCE

The present application is a continuation-in-part of U.S. patent application Ser. No. 12/056,171, filed Mar. 26, 2008, and makes reference to, claims priority to, and claims benefit of U.S. Provisional Patent Application No. 61/436,506, entitled "Breath Sensitive Digital Interface," filed Jan. 26, 2011.

In addition, the present application hereby makes reference to U.S. Provisional Patent Application No. 61/431,716, entitled "MEMS/MOEMS Sensor Design," filed Jan. 11, 2011, U.S. patent application Ser. No. 12/055,999, entitled "Method And System For A MEMS Detector That Enables Control Of A Device Using Human Breath," filed Mar. 26, 2008, and to U.S. patent application Ser. No. 13/348,537, entitled "MEMS/MOEMS Sensor Design," filed Jan. 11, 2012.

The complete subject matter of each of U.S. Provisional Patent Application No. 61/436,506, U.S. Provisional Patent Application No. 61/431,716, U.S. patent application Ser. No. 12/055,999, and U.S. patent application Ser. No. 13/348, 537, is hereby incorporated herein by reference, in its respective entirety.

FIELD OF THE INVENTION

Certain embodiments of the invention relate to a system for controlling digital media. More specifically, certain embodiments of the invention relate to a digital interface that uses a fluid, such as a person's breath, to allow a user to navigate through digital media.

BACKGROUND OF THE INVENTION

Digital media has become a part of most people's daily lives, including checking e-mails, paying bills online, updating social media (such as Facebook or Twitter), gaming or simply surfing the web. It is common for people to have multiple electronic devices, such as desktop computers, laptop computers, tablets and smartphones for completing these tasks. As digital media becomes engrained in our daily lives, it is important to have multiple methods for manipulating and navigating through the growing diversity of applications and usage scenarios for these devices.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for a breath-sensitive interface, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 6B illustrates an exemplary 3D interface that may correspond to the user interface of FIG. 6A, in which a user is selecting and/or manipulating a particular graphical display element in a layer using finger(s) on a touch sensitive interface, that may correspond, for example, to the elements of FIG. 6A, in a representative embodiment of the present invention.

FIG. 6C illustrates an exemplary 3D interface that may correspond to the user interface of FIG. 6A, in which the layer has become the foreground or "active" layer, in accordance with a representative embodiment of the present invention.

FIG. 6D shows an exemplary user interface in which applications or content are represented as graphical objects in a 3D environment presented in two-dimensions (2D) on a display, in which a representative embodiment of the present invention may be practiced.

FIG. 6E illustrates both an oblique view and a top view of a user engaged with a 3D user interface that may correspond to the exemplary user interface of FIG. 6D, in which applications or content are represented as graphical objects in a 3D environment presented in 2D on a display, in accordance with a representative embodiment of the present invention.

FIG. 6F also illustrates an oblique view and a top view of a user engaged with a 3D user interface that may correspond to the exemplary user interfaces of FIGS. 6D and 6E, in which applications or content are represented as graphical objects in a 3D environment presented in 2D on a display, in accordance with a representative embodiment of the present invention.

DETAILED DESCRIPTION OF THE INVENTION

Figure 1A:
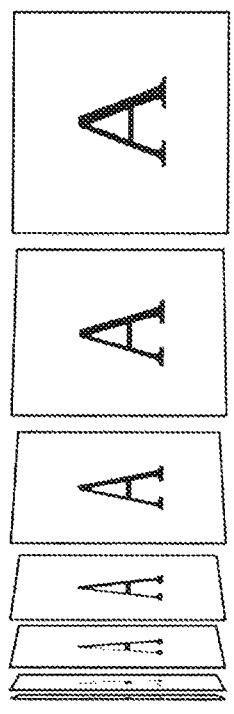
FIGS. 1A-1B illustrate two exemplary forms of visual feedback that may be provided to a user of a breath sensitive digital interface, in accordance with the present invention.

Aspects of the present invention relate to the use of an input device for control of a graphical user interface. More specifically, representative embodiments of the present invention may relate to the use of exhaled breath of a user upon a unique sensing device, in which the user is in proximity to, but is in open space and not connected by a channel to, the sensing device, to control various aspects of a graphical user interface of an electronic device.

Typical digital systems often provide information in "windows." These systems typically allow users to have multiple applications or other such elements open at the same time, within the memory constraints of the particular system. However, it still remains complex and uneasy for users to juggle multiple applications and related content, including the swapping of information between the applications.

Over the past several years, user interaction has primarily been based on user actions that include, for example, pointing, clicking, pulling down menus, scrolling lists, etc. Such systems demand great accuracy and may be limited in their design, use, navigation and control, and may restrict user interaction with social media, multimedia applications and other new usage scenarios where content consumption tends to be favored over content creation. Users typically input information into these systems with a keyboard and/or a mouse, touch sensitive surfaces, gesture recognition systems, or speech-enabled solutions, which have a limited "vocabulary." These input means do not further enable interaction with many modern applications, where interaction may be based on "flicking" and resizing of content, yet with an ever-growing number of additional features, whether contextual, 3D, or otherwise, designed to help users manage their settings and browse more content flowing to devices, while enhancing the user experience.

Touch- or gesture-based systems have started to replace the point-and-click methods. Such tools provide more natural, intuitive responses, such as the ability to utilize momentum (e.g., fast scroll on a touch screen phone). These new interfaces, however, while bringing simplicity, have very limited vocabularies. For example, touch-sensitive smart phones and tablets may be restricted to tap (select), swipe (scroll, pan) and some multi-touch features (e.g., stretch-and-pinch to zoom in and out).

While these touch- or gesture-based approaches have provided improvements to the user experience and user interaction with digital media, they suffer from many drawbacks. Gesture-based interaction and such methods require movement from the user. This may not be practical if the user is in tight quarters (e.g., as in a cubicle) or has limited range of movement, such as in mobile usage situations where the user may only be able to use one hand or social acceptance might be questioned. Also, unlike the mouse, which simply sets on a desktop or flat surface, touch- or gesture-based systems may require the user to move his or her arm in space, possibly without support. This can cause fatigue, preventing the user from working for extended periods of time. It can also lead to what may be referred to as "gorilla arm" (i.e. a condition in which the human arm held in horizontal positions rapidly becomes fatigued and painful) or other muscular and posture issues. These touch- or gesture-based techniques also suffer from being "always on," and thus cannot distinguish between an intended movement (i.e. moving your arm so as to scroll) and an unintended movement (i.e. moving your arm to scratch your head, as well as the motion of people in the vicinity.) In addition, users may be required to keep their arms up in the air for a certain period of time to confirm a selection. If the user of a mouse lets go of the mouse, the mouse stays in position. Touch- or gesture-based systems, however, do not "stay put" when released. Such techniques can also cause occlusion of the displayed content, as the user's hand or arm may end up in front of the content being viewed.

Moreover, today's mainstream devices (e.g. TVs, computers, and handheld devices) have started to incorporate three dimensional (3D) graphics. 3D interfaces may provide the user more working space, making it easier to multitask. These interfaces also provide new elements of interaction vocabulary and provide the user a more natural, organic experience. The current touch- or gesture-based techniques encounter even additional problems when used in such a 3D setting. For example, users may suffer from a lack of coordination because they have difficulty in controlling the spatial placement of their hands/arms so as to differentiate between the "active" items on the display, and those in the "background." The user may also suffer from anatomical limitations because, for example, human joints can only rotate to certain positions. The digital media may also have difficulty syncing or tracking the user's movements, for example, because of light, contrast, and/or color issues. If the user of a mouse lets go of the mouse, the mouse stays in position. Touch- or gesture-based systems, however, do not "stay put" when released.

Several current interface designs attempt to overcome these issues from a software standpoint. One approach towards developing a "next-generation" interface is Microsoft's Aero, which is found in Microsoft Windows Vista and 7. This design is based on a 2D-simulation of a 3D-stack. The Aero visual experience includes translucent frames, shadows, and thumbnail previews, for example. Applications or information on the "active" layer may be uniquely designated such as, for example, by being displayed in a larger font or in a color for which the "background" layers are grayed out. More recent interface designs may implement solutions similar to CybercomLab's MultiLayer Parallax desktop user interface (see, e.g., http://mynokiablog.com/2010/12/05/video-qt-quickqml-multilayer-parallax-desktop-ui-on-meego/), which may have switches (e.g., virtual buttons) to swap between the "active" and "background" segments, thus enabling a "simulated," multilayer, 3D graphical user interface, rather than "actual" 3D, due to the lack of a suitable input device. However, the above-mentioned user-interface designs remain limited due to the screen becoming rapidly saturated and are tedious in managing, exchanging and manipulating applications and content.

Another example may be illustrated by solutions similar to HP's TouchSmart, touch-enabled personal computer display, which opens applications as rectangular blocks so that one open application occupies the majority of the screen. Additional applications are located adjacent to the open or active application, and can be partially seen on the edges of the screen. To use one of the additional applications, the user simply drags the desired application to the center of the screen. The user must carefully interact with the touch screen, to avoid tapping and thus launching an application or opening a picture in full-screen mode while attempting to simply swipe and flick content, to avoid displacing an open application while interacting within its window's boundaries, and to avoid modifying the content of an open or active window while dragging other applications to the center of the screen. Other applications such as, for example, Cooliris from Cooliris, Inc., or HTC's TouchFLOT™ from HTC America, also enable comparable user interface displays for pictures, open files, and applications, for example.

Other systems may use volumetric displays to enable a more natural way of displaying. These displays utilize complex controls, and a difficult differentiation of dedicated interaction tools. Moreover, such systems may not be suitable to most lifestyle and use cases. One example of such a volumetric display is the 360-degree auto-stereoscopic display prototype shown by Sony at the SIGGRAPH 2010 Conference held Jul. 25-29, 2010, in Los Angeles, Calif.

Other systems use voice commands to interact with the digital media. These methods again suffer from being "always on," allowing unintended sounds or background noise to interfere with intentional user input, unless additional switches or other commands are added to disambiguate the input, or the interaction field is severely limited. In addition, such methods have limited applicability to graphical user interfaces.

Additional information and further examples of input devices and interfaces can be found at http://www.almaden.ibm.com/u/zhai/papers/siggraph/final.html and http://www.cas.mcmaster.ca/~leduc/studTheses/mAlamMSCthesis.pdf. These examples illustrate the limits of "split screen" and "simulated 3D" designs and the importance of a real, rich content 2D- or 3D-graphical user interface to visualize enhanced multimedia content, for example, in the form of several windows at once, as well as new, usable input devices suited for object manipulation.

Representative embodiments of the present invention may be found in a breath-sensitive digital interface or a method of using such an interface.

Various representative embodiments of the current invention include aligning information in multiple different layers or segments on an interface or screen (such as that of a TV, computer or handheld device). The user then provides input to control at least one of the layers using a fluid, such as the user's breath. In one representative embodiment, the user may also concurrently control other layer(s) using standard input devices such as those identified above, including, for example, touch-, voice-, or gesture-based controls. In such representative embodiments, a sensor may be positioned in the proximity of the user's mouth (e.g., 5 to 10 centimeters or more, depending on functions), which allows the user to effortlessly breathe towards the sensor, either continuously or in "puffs," while accurately controlling the direction of his or her breath over, at, across, or upon a confined area (e.g., in the order of a $cm^2$), with or without momentum and other natural interaction features such as fluttering, shaking, floating, whizzing, for example.

This breath-sensitive interface enables smooth navigation of overlays, particularly given that it greatly alleviates the manipulation of simultaneously displayed elements. It also brings new tools to the user interface developer's toolkit. The transparency and fluidity qualities of air or breath also translate well into digital functionalities, whether existing, such as—similar to toy pinwheels—, or those yet to be developed, thanks to the boundless creativity of the digital community. As such, a breath-sensitive interface in accordance with a representative embodiment of the present invention is an ideal complement to finger-, hand-, touch-, facial recognition-, speech-, neurosensing-, or gesture-based systems currently or yet to be used to enable 3D interaction, and can be integrated into an endless number of applications. A few exemplary embodiments and applications are described below.

One representative embodiment of the present invention aims at enabling an easy and natural way to navigate rich content and applications, several windows and/or layers at a time, to allow the user to explore, compare and swap files between several applications, in parallel. Such an embodiment also enhances the ability of users of a 3D-graphical user interface to organize their content in a widespread, spatial way that the user can better remember. In addition, a representative embodiment of the present invention allows the user to multitask and review large amounts of data or images more conveniently such as, for example, a picture in picture, fast browse of a photo library within an open window/application. Representative embodiments of the present invention also allow novel, fun and appealing ways to interact with digital media such as, for example, panning and zooming, allowing one to swoop on virtual elements to emphasize areas of interest, or to alleviate the management of audio/video streaming while achieving other tasks—e.g., by puffing to set audio volume, brightness or contrast. Various representative embodiments of the present invention can also provide new touch interfaces, such as enabling the user to touch only within the boundaries of the window of the active application, while changing the active application may be achieved by puffing, thus substantially reducing unintentional interactions.

Use of a representative embodiment of the present invention also lightens the workload put on the user's hands and fingers, for example by enabling an easy differentiation between hand-based, whether touch- and/or gesture-enabled, direct content manipulation (e.g., dragging, resizing, etc.) and spatial control, enabled via directional puffs (e.g., 3D navigation). A representative embodiment of the present invention may be employed as one of multiple input methods used for multimodal interaction, in which any combination of input methods may be used.

Use of a representative embodiment of the present invention also minimizes the risk of unintended inputs altering the user's experience. The chances that a user may exhale across the tiny surface of a breath sensor in accordance with representative embodiments of the present invention in a sufficiently coherent way and with a path that may be interpreted as say, a command to scroll, are extremely low. As such, a sensor in accordance with a representative embodiment of the present invention may be very accurate at determining whether the airflow received is intentional or not, well before the information is processed by a software application, through the use of calibration and other algorithms.

A representative embodiment of the present invention may be used to enable intuitive "six degrees of freedom" interaction, either standalone or in a multimodal combination with touch, gesture, or other interfaces. Aspects of a representative embodiment of the present invention may be flexibly used to deliver a variety of combinations of movement along the X, Y, or Z-axis, as well as rotational interaction. For example, in a standalone situation, one exemplary design may be based on repeated puffs within a certain period of time where, for example, a first puff sets a first direction and speed of motion, while a second puff sets another direction and speed, the two combined allowing to the user to define a rotation. The speed at which the airflow is being swept across the sensor, as well as the pressure level at which a user exhales at the sensor may be modeled in a variety of ways to define properties such as, for example, the angle, depth and velocity of the rotation.

Besides, many designs may be implemented when combined with other interaction techniques to aim at the most intuitive and effortless interaction between humans and digital platforms. Such an embodiment may also allow for easier coordination of input controls, which is especially critical in 3D interaction. Representative embodiments of the present invention enable the user to control/render the displacement of all degrees of freedom at the same pace, which empowers users to fully enjoy what they may achieve with their hands (such as via touch-, gesture- or pressure-based techniques), while smoothly browsing their 3D virtual environment, in an effortless way and without content occlusion, regardless of what size of display is used. In certain environments, interaction modes which may be implemented with, for example, digital paper, such as bending the support in a convex or concave way, which is totally double-handed, may be a solution for flexible displays.

A representative embodiment of the present invention may be employed to enhance usability through optimal device acquisition. As described in Applicant's other patents and patent applications, including U.S. Provisional Patent Application No. 61/431,716, entitled "MEMS/MOEMS Sensor Design," filed Jan. 11, 2011, U.S. Provisional Patent Application No. 61/436,506, entitled "Breath Sensitive Digital Interface," filed Jan. 26, 2011, and U.S. patent application Ser. No. 12/055,999, entitled "Method And System For A MEMS Detector That Enables Control Of A Device Using Human Breath," filed Mar. 26, 2008, which describe a sensor technology suitable for use with the inventions described herein, and which are hereby incorporated herein by reference, in their respective entireties. Representative embodiments in accordance with aspects of Applicant's breath sensor can be configured in many different ways and can communicate with digital media in multiple fashions. Regardless of whether Applicant's system is used in handheld devices, which are by definition within arm's length distance, or in larger systems, where the sensor may be unobtrusively worn, a breath sensor in accordance with a representative embodiment of the present invention can be located in a convenient position where it can monitor the user's breath while being in communication with the digital media for optimal usage scenarios.

Applicant's interface is "universal" (i.e., it can be used in any user interface, including a graphical or zooming user interface) and can be used for a variety of applications. It should be noted that the following examples of possible applications are provided for illustrative purposes, and are not meant to necessarily limit the present invention in any manner. While some of these examples show the interface on a computer, aspects of the present invention can be employed on any appropriate digital device including, but not limited to a television (TV), a personal computer (PC), or any convergent devices, whether PC-centric or TV-centric, which allow to browse the Internet, to watch TV, for example, within a single interface. Aspects may also be employed in, for example, a tablet computer, a cellular or smart phone, and a portable media player. Representative embodiments of Applicant's interface may also be used in multi-display systems.

One major goal of 3D interfaces is to enable users to organize their content and applications in a rich, faster to access, appealing, and intuitive way. Users may use a number of clustered visual elements that may rapidly occupy the entire screen, which may be furthermore "augmented," for example, with visual qualities such as depth and blurriness, as well, as they may superimpose on the surrounding environment to deliver, for example, location-based contextual information. While 3D environments provide enhanced visualization, their navigation requires multidimensional interaction and hence novel interaction tools to be implemented.

In such contexts, icons, applications, widgets, bookmarks, or real-time informational blocks (e.g., social media and any virtual elements such as data, and miscellaneous types of information displayed to augment social data, or search results, or games, and any other applications, based on user location, personal settings, and contextual knowledge, for example) may be clustered in multi-layer/multi-dimensional environments and manipulated via displacement combined with "zoom"-like features. The use of various aspects of the present invention enable users to control the display size/angle or the transparency of items displayed on the interface or screen. Enabling users to manage angular display and transparency levels is significant in enhancing the user experience in 3D-environments, particularly by allowing for easy management of overlays and superimpositions.

Representative embodiments of the present invention further enable single-handed interaction, disambiguate interaction mechanisms, and improve user satisfaction by reducing unintentional inputs, and enable developers to expand the vocabulary of interaction to be implemented with the original method (e.g., touch may be used for some additional, richer functions).

One representative embodiment of the present invention may be used to manage the position, angle, or transparency/blurriness of displayed objects or elements, for example, by puffing over, at, across, or upon a layer of icons to change their orientation according to the direction of the airflow (e.g., from the right to the left), thereby minimizing the icon's obtrusiveness. Another exemplary embodiment of the present invention may involve a user puffing across a series of elements or objects on a display (e.g., including across the stressable area of a breath sensor as described herein, that may be embedded in the host device such as at the bottom of the display) to "virtually dissolve" them. It should be noted that a representative embodiment of the present invention may include multiple breath-sensitive sensors located at various positions about a device such as, for example, at or along one or more of the edges of a display or other part of a device that is exposed to the exhaled breath of a user.

Figure 1B:
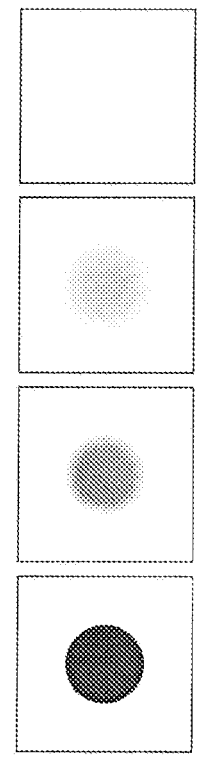

FIGS. 1A-1B illustrate two exemplary forms of visual feedback that may be provided to a user of a breath sensitive digital interface in accordance with the present invention. As illustrated in FIG. 1A, the user may puff in one direction (as shown in the example of FIG. 1A, to the right) to make the group of displayed elements become "flatter" (e.g., FIG. 1A) or as illustrated in FIG. 1B, progressively blurrier. In a similar manner, the displayed elements may then be restored to their original state upon the user puffing across the same group of elements in the opposite direction.

Figure 2:
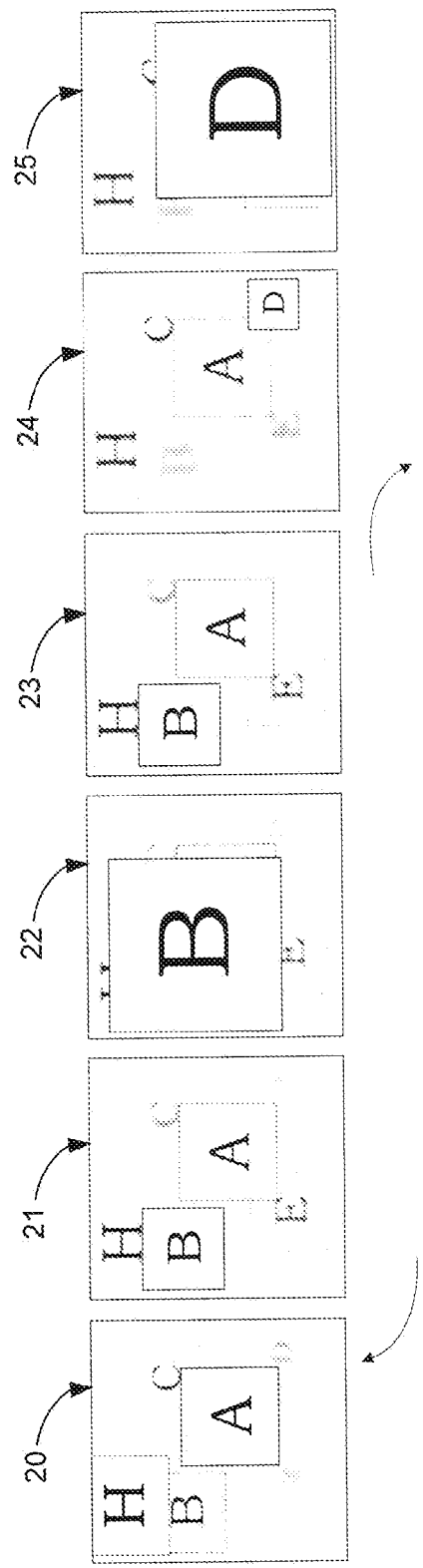
FIG. 2 illustrates screens of an exemplary embodiment of the current invention in which numerous display elements A-H are aligned in multiple "layers" or "dimensions" of each of the screens, in accordance with a representative embodiment of the present invention.

FIG. 2 illustrates screens of an exemplary embodiment of the current invention in which numerous display elements A-H are aligned in multiple "layers" or "dimensions" of each of the screens 20-25, in accordance with a representative embodiment of the present invention. The display elements A-H of the screens 20-25 may be, for example, graphical icons or thumbnail representations of files and applications. The initial screen (shown on the left side of the page as screen 20) allows the user to easily select display elements "A" and "H," the non-blurred display elements. It may be tedious to pan/flick by dragging the user's fingers across the screen 20 of FIG. 2 to discover more display elements or displace some display elements, which may prevent the user from tapping other display elements positioned underneath the non-blurred display elements. In some cases, a display of a device may simply be cluttered with pictures, which frequently happens with a variety of interfaces such as video-on-demand (VOD), picture libraries, and the like, without the need for such arrangement to integrate transparencies or multilayered elements. In such situations, it becomes very likely for a user to tap an active element, while attempting to pan or scroll, for example. Oftentimes, this substantial occlusion of displayed content may result in unintentional inputs as the user attempts to select and/or move displayed objects or elements. The use of a representative embodiment of the present invention helps prevent such occlusion. For example, using a representative embodiment of the present invention, the user may puff "up and left" so as to highlight or select display element "B," as shown in screen 21 of FIG. 2 (and possibly and proportionally, for example, to display element "E"). This may be indicated, for example, by moving a cursor, by highlighting pixels, or by producing other visually compelling designs such as, for example, a deformation of the background, like it was blown away/deformed where the virtual cursor is displaced.

It should noted here that other combinations of, for example, motions or movements, durations, and pressures of directed breath, may be used in place of the examples given here, without departing from the spirit of the present invention. For example, instead of puffing "up and left" as described above, a representative embodiment of the present invention may be configured by a user or the manufacturer to recognize puffing "down and right" as requesting the same action.

Once highlighted or selected, display element "B" may be brought closer (i.e., made less blurry) and/or resized, as in screen 22 of FIG. 2. In this example, the differentiation between touch- and puff-enabled actions makes it easier and less error prone for the user to resize display element "B" since, in this preferred design, finger dragging may not be enabled to pan/flick, but rather to resize only (i.e. the active vocabulary of the user interface may be arranged so that a user may puff to pan/flick, tap to select, and drag to resize). Once display element "B" is resized to be smaller and less obtrusive, as in screen 23 of FIG. 2, the user may puff (in the example of FIG. 2, toward the lower-right portion of the screen) so that display element "D", or display element "C" (in one proportional/isometric design) may become less blurred, as illustrated in screens 24 and 25 of FIG. 2, respectively. The user may then, for example, tap to select, and drag to resize, etc.

Figure 3:
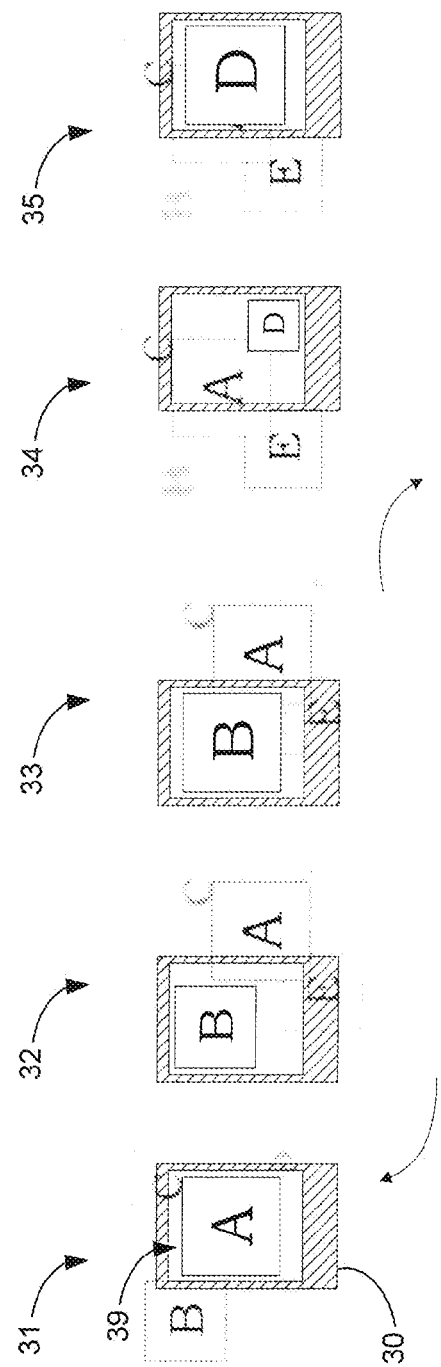
FIG. 3 illustrates states of use of another exemplary user interface in which a user of an electronic device arranges and selects elements A-E that may represent, for example, applications or content, in accordance with a representative embodiment of the present invention.

FIG. 3 illustrates states 31-35 of use of another exemplary user interface in which a user of an electronic device 30 arranges and selects elements A-E that may represent, for example, applications or content, in accordance with a representative embodiment of the present invention. In the illustration of FIG. 3, the displayed elements A-E are systematically aligned in multiple layers. As shown in the example of FIG. 3, the "active" or selected object or element occupies the largest portion of the screen 39 of device 30 (or in the largest dimension possible that respects the isometric aspect of the element so that no deformation is allowed).

For example, at state 31 of FIG. 3, display element "A" is initially shown as the active or selected element, represented by element "A" being the element displayed in its entirety, or occupying the largest portion of the display. In the example of FIG. 3, the user may then use his or her breath to highlight other elements (e.g., "B," "C," "D," or "E"). For example, the user may puff "up and left," towards display element "B." When the user stops puffing (e.g., for a defined amount of time, enabled by the microcontroller's clock, and/or based on A/D conversion and the presence, or lack, of an input signal), the display elements "A"-"E" are re-aligned such that display element "B" occupies the largest portion of the screen, as in state 32 of FIG. 3. Thereafter, a rich interaction may be available with, and within the boundaries of, the application or content represented by displayed element "B" in state 33, until the user puffs, for example, "down and right," to explore and discover other elements within the user interface or application such as, for example, display element "D," as shown in state 34 35 of FIG. 3. Again, in the example of FIG. 3, when the user stops puffing, the display elements "A"-"E" are re-aligned so that display element "D" occupies the largest portion of the display of the electronic device 30, as shown at state 35, indicating it has become the active or selected application or content. It should again be noted that other combinations of, for example, motions or movements, durations, and pressures of directed breath, may be used in place of the examples given here, without departing from the spirit of the present invention. For example, instead of puffing "down and right" as described above, a representative embodiment of the present invention may be configured by a user or the manufacturer to recognize puffing "up and left" as requesting the same action. In addition, it should be noted that a multimodal interface may be used where, for example, touch-, gesture-, or voice-based inputs are used in conjunction with a breath-sensitive digital interface, in which those modes of user input are processed to act as commands to perform some of the actions described above.

Figure 4:
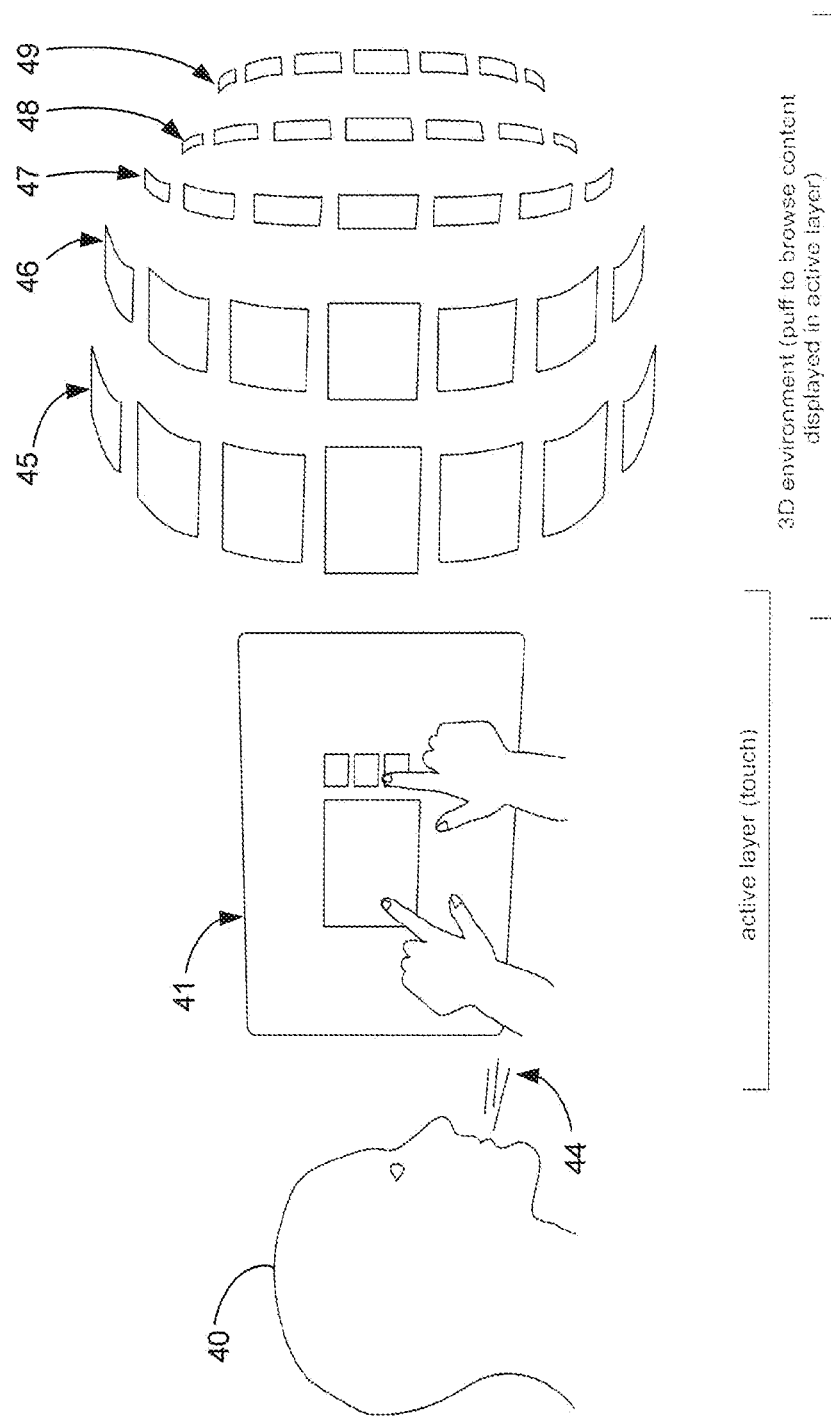
FIG. 4 illustrates another exemplary embodiment of a user interface illustrating the use of breath in combination with a secondary control means such as, for example, digital input such as a mouse or touch, to control selection or activation of separate layers Layer 1 to Layer 5, in accordance with a representative embodiment of the present invention.

FIG. 4 illustrates another exemplary embodiment of a user interface illustrating the use of breath in combination with a secondary control means such as, for example, digital input such as a mouse or touch, to control selection or activation of separate layers Layer 1 45 to Layer 5 49, in accordance with a representative embodiment of the present invention. As shown in FIG. 4, a user 40 is positioned in front of a touch sensitive display screen 41. The user 40 is arranged to use breath 44 upon a sensor of a breath-sensitive digital interface (not shown) in accordance with a representative embodiment of the present invention. In FIG. 4, Layer 1 45 may represent a photo editing application, fully open with tools and widgets, whereas Layer 2 46 may represent a library of pictures, seen through the photo editing application of Layer 1 45. As shown, the user 40 can manipulate (e.g., scroll, select, etc.) the information in Layer 1 45 (i.e., the photo editing application) entirely with his or her fingers, using the touch sensitive display screen 41. The user 40 may also then manipulate the information in Layer 2 46 (i.e., the pictures of the library) by puffing (e.g., by blowing in a downward motion on the sensor so as to scroll down through a column of pictures from the library of pictures represented by layer 2 46). This configuration or mapping of user inputs to layers could be swapped (i.e., to use breath to control Layer 1 45 instead of touch), or can be used with configurations containing additional layers beyond the layers Layer 1 45 and Layer 2 46, such as layers Layer 3 47 through Layer 5 49, as illustrated in FIG. 4.

Using this configuration allows for a smooth, simple interaction with no need to repeatedly switch layers. Interaction may be generated by continuous and/or impulse puffs in proximity to the breath sensor, with or without momentum and/or acceleration. Through the use of a representative embodiment of the present invention, productivity is substantially enhanced, paving the way to the development of next generation user interfaces and related applications, by unlocking the maxed out vocabulary of touch and gesture techniques currently in use, allowing for fast and disambiguated controls, as well as fully leveraging fine resolution tasks by using fingers on the screen. Indeed, gesture-tracking techniques (e.g., those using cameras, infrared (IR) sensors, and gyroscopes) may be difficult to implement in close environments, where the hands of a user may repeatedly move back and forth to the surface of the display screen, mostly with small amplitude motion. Engaging in such user behavior with conventional touch and gesture input techniques may result in a high rate of unwanted or unintended inputs and controls.

Figure 5A:
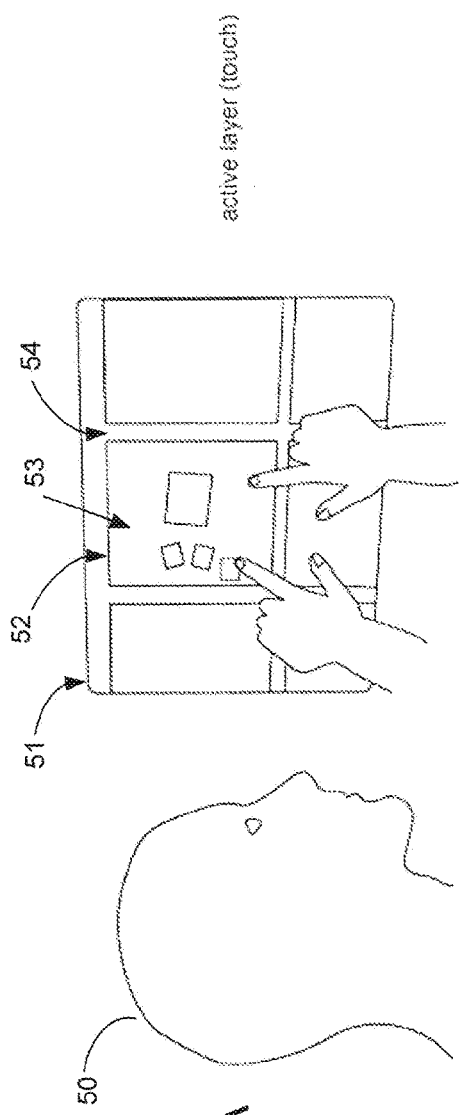
FIGS. 5A-5B illustrate an example of a touch-based user interface in which open applications are displayed in blocks of a grid of blocks or regions on a touch sensitive interface of a display screen of an information system, in accordance with a representative embodiment of the present invention.
Figure 5B:
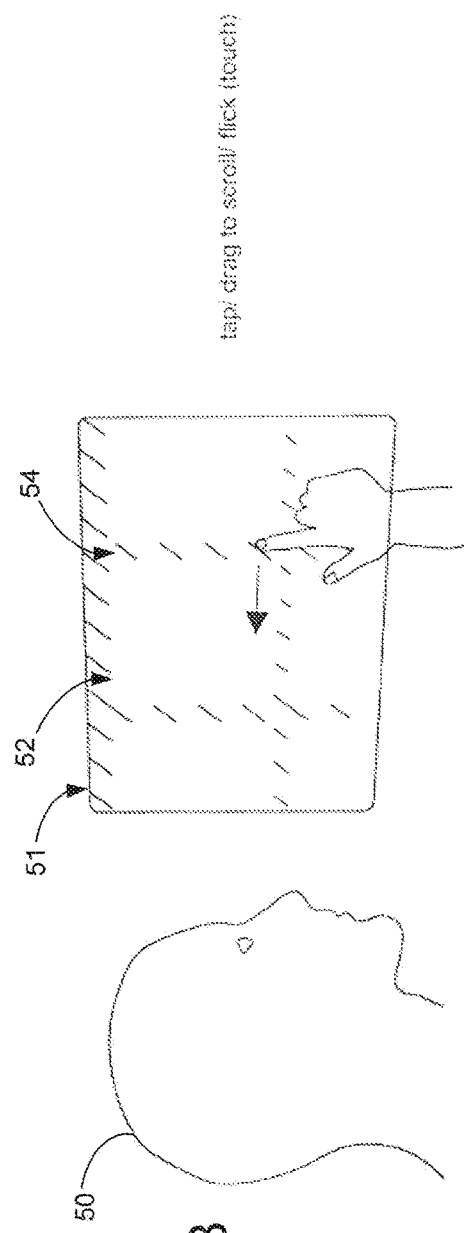

FIGS. 5A-5B illustrate an example of a touch-based user interface in which open applications are displayed in blocks of a grid of blocks or regions on a touch sensitive interface of a display screen 51 of an information system, in accordance with a representative embodiment of the present invention. FIG. 5A illustrates a user 50 moving their finger (s) with respect to the touch sensitive interface to interact with elements of an active application in one block 52 of the grid shown on display screen 51. As illustrated in FIG. 5A, the blocks of the grid are separated by spaces 54. In the example of FIG. 5A, the user 50 may employ fingers of one or both hands within the block 52 to manipulate the displayed elements or objects and to control the application represented by block 52. The motions of the finger(s) of the user 50 on the touch sensitive interface of the display screen 51 intended as input to the open application of the "block" 52 may, from time to time, be misinterpreted by the information system as finger motions used to pan/"flick" the grid of blocks, leading to erroneous movement of the grid on the display screen 51.

FIG. 5B illustrates the grid of the exemplary touch-based user interface of FIG. 5A in which the user 50 attempts to manually pan or "flick" the grid of blocks in order to move to a different open application in a different block of the grid, using their finger(s). In the example of FIG. 5B, the user 50 touches the touch sensitive display 51 at the space 54 between the blocks of the grid and moves their finger to the left, to indicate a desire to shift the blocks of the grid to the left, to access an application or content in one of the other blocks of the grid. Attempts by the user 50 to move the grid on the display screen 51 by touching the space 54 may, however, be incorrectly interpreted as input to the active application of block 52, causing erroneous inputs to the active application of block 52. It should be noted that whatever arrangements are implemented, it may be difficult to combine rich interaction with both target content and blocks of the user interface, using a single mode of interaction.

Figure 5C:
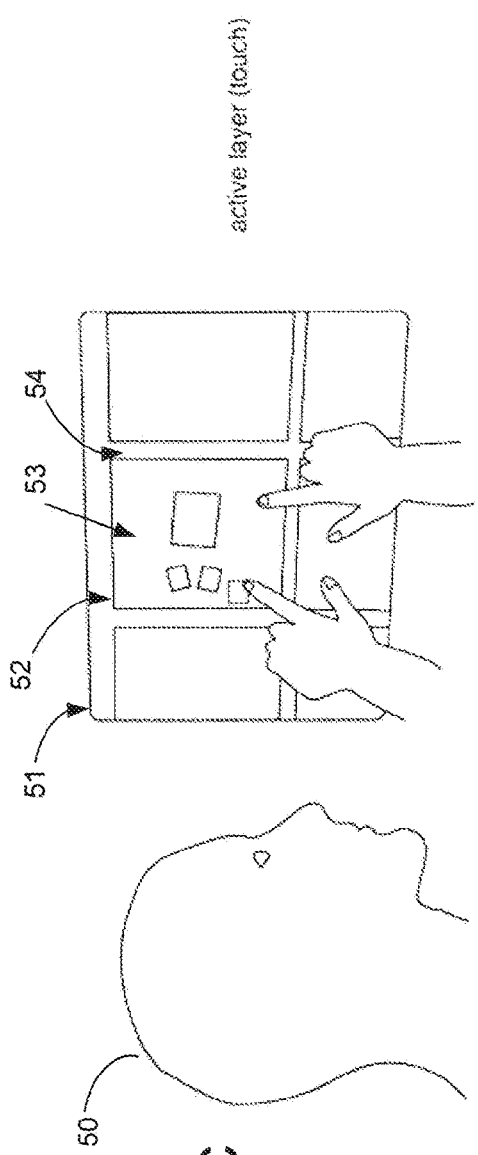
FIGS. 5C-5D illustrate another exemplary embodiment of a user interface in which open applications are displayed in a grid of blocks or regions on a touch sensitive interface of display screen of an information system that further employs a breath sensitive digital interface, in accordance with a representative embodiment of the present invention.
Figure 5D:
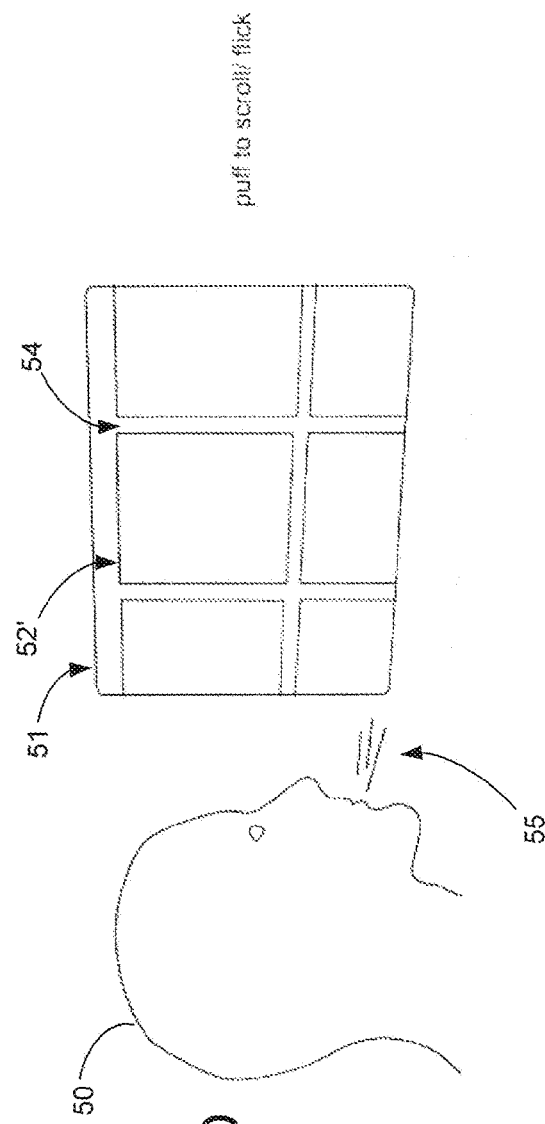

FIGS. 5C-5D illustrate another exemplary embodiment of a user interface in which open applications are displayed in a grid of blocks or regions 52 on a touch sensitive interface of display screen 51 of an information system that further employs a breath sensitive digital interface, in accordance with a representative embodiment of the present invention. As in FIG. 5A, FIG. 5C illustrates a user 50 moving their finger(s) with respect to the touch sensitive interface to interact with elements of an active application in one "block" 52 of the grid shown on display screen 51. As illustrated in FIG. 5A, the blocks of the grid of FIG. 5C are separated by spaces 54. As in the example of FIG. 5*a*, the user 50 of FIG. 5C may employ fingers of one or both hands within the block 52 to manipulate the displayed elements or objects and to control the application represented by block 52. The motions of the finger(s) of the user 50 on the touch sensitive interface of the display screen 51 intended as input to the open application of the "block" 52 may not, however, be misinterpreted by the information system as finger motions used to pan/"flick" the grid of blocks, in that the user interface of FIG. 5C does not accept such user input a commands for movement of the grid on the display screen 51.

FIG. 5D, however, illustrates the user 50 using a puff 55 in proximity to a breath sensitive digital interface (not shown) to move to a different application in a different block 52' of the grid of blocks, in accordance with a representative embodiment of the present invention. In such an arrangement, the motions of the finger(s) of the user 50 on the touch sensitive interface of the display screen 51 intended as input to open application of the "block" 52 cannot be misinterpreted by the information system as finger motions used to pan/flick the grid of blocks, as the touch sensitive interface of the display screen 51 is not arranged to interpret such finger motions in that manner, and do not lead to erroneous movement of the grid on the display screen 51. Similarly, "puffs" 55 by the user 50 to move the grid of the user interface shown on the display screen 51 using a representative embodiment of the breath sensitive digital interface of the present invention are not incorrectly interpreted as input to the active application of block 52', in that the information system is not arranged to interpret such actions as actions directed to the open application of the grid of blocks, and do not cause erroneous inputs to the active application of block 52'.

In the embodiment illustrated in FIG. 5D, the user can rapidly juggle applications, without launching them, and without having to click on a tray or icon. In such a design, the block of every open application is enabled for touch control of the functions of the open application, which in turns leaves the little spaces 54 between application blocks (i.e., the hatch of FIG. 5B) as an inactive, safe area separating the active area of each block of the grid of blocks from its neighbors. By using breath (e.g., puffing), the user 50 is able to move application windows (i.e., blocks) of the grid of blocks, without the actions of the user (e.g., the puffing) being erroneously interpreted as input to the applications of the blocks of the grid of blocks. In addition, aspects of the user interface of FIGS. 5A-5D set aside as interaction elements, such as the display area taken up by the spaces 54, may be minimized or eliminated, allowing designers and users to maximize the amount of the display occupied by application and content.

Figure 6A:
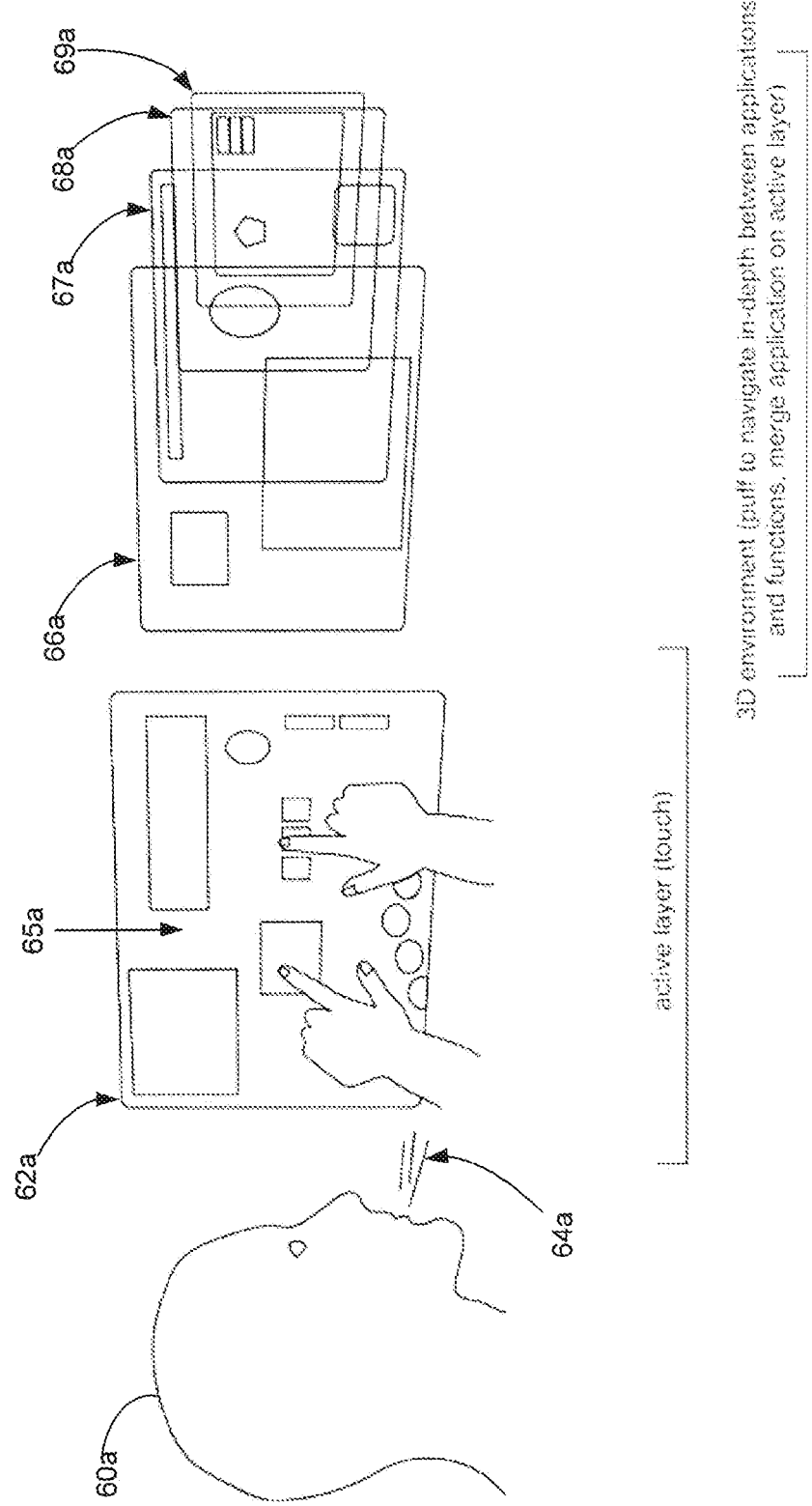
FIG. 6A illustrates an exemplary three dimensional (3D) interface employing the exhaled breath of a user as a form of input to an active application of a layer represented on a touch sensitive interface of a display, in accordance with a representative embodiment of the present invention.

FIG. 6A illustrates an exemplary 3D interface employing the exhaled breath of a user 60*a* as a form of input to an active application of a layer 65*a* represented on a touch sensitive interface of a display 62*a*, in accordance with a representative embodiment of the present invention. In this example, the user 60*a* may interact with the information of the "active" application using any input means, including, for example, through touch using his or her fingers on the display 65*a*. The user 60*a* may then use his or her breath 64*a* directed over, at, or upon a breath-sensitive digital interface (not shown) to direct information "to the forefront" (i.e., the active layer), or to push information "into the background." In the illustration of FIG. 6A, the user 60*a* interacts with the touch sensitive interface of the display 62*a* to manipulate the displayed elements of layer 65*a*, which may represent an application or a collection of digital media, for example. The user 60*a* may also have other applications or digital media located in other layers represented in FIG. 6A as layers 66*a*, 67*a*, 68*a*, and 69*a*, which may appear to be at various depths behind the layer 65, and which are not receiving the actions of user 60*a* as input. The illustration of the breath 64*a* of the user 60*a* in FIG. 6A is provided to indicate that the user 60*a* is able to make use of a breath sensitive digital interface as input to a 3D user interface, in accordance with a representative embodiment of the present invention.

FIG. 6B illustrates an exemplary 3D interface that may correspond to the user interface of FIG. 6A, in which a user 60*b* is selecting and/or manipulating a particular graphical display element 61*b* in a layer 62*b* using finger(s) on a touch sensitive interface 65*b*, that may correspond, for example, to the similar of FIG. 6A, in a representative embodiment of the present invention. This does not necessarily represent a specific limitation of the present invention, as the user 60*b* could instead be using, for example, a gesture-based interface. FIG. 6B further illustrates the additional layers 66*b*, 67*b*, 68*b*, 69*b*, as illustrated in FIG. 6A. In the illustration of the embodiment of FIG. 6B, the user 60*b* employs exhaled breath 64*b* over, at, or upon a breath sensitive digital interface (not shown) to provide user input independent from that provided by the finger(s) of user 60*b* on the touch sensitive interface 6*b*, in order to change the layer presented to the user as the foreground or "active" layer. In the instance of FIG. 6B, the user 60*b* selects the graphical display element 61*b* of layer 65*b*, and then directs their breath 64*b* upon the breath sensitive digital interface such that layer 67*b* is then positioned into the foreground as the "active" layer displayed on the display 65*b*. For example, the user 60*b* may puff upward across the breath-sensitive digital interface to move elements into the background, or puff downward, to move elements into the foreground.

FIG. 6C illustrates an exemplary 3D interface that may correspond to the user interface of FIG. 6A, in which the layer 67*c* has become the foreground or "active" layer, in accordance with a representative embodiment of the present invention. After selecting the graphical element 61*c* of layer 65*c*, the user 60*c* may then change the position/arrangement of his or her finger(s) on the touch sensitive interface of the display 62*c*, to indicate his or her desire to copy or move (e.g., "drag and drop") the digital media represented by display element 61*c*, in 3D from layer 65*c* to layer 67*c*. In another representative embodiment of the present invention, each "puff" of breath by user 60*c* upon a breath sensitive digital interface (not shown) may simply cause changes in the graphical representations of the layers 65*c*, 66*c*, 67*c*, 68*c*, 69*c* of FIG. 6C by, for example, uniquely setting the color, brightness, and/or focus of one of the layers 65*c*-69*c* to a particular level, to convey which of the layers 65*c*, 66*c*, 67*c*, 68*c*, 69*c* is the layer to which the selected display element 61*c* is to be copied/moved/etc.

Although the above example illustrated in FIGS. 6A-6C employs a particular sequence of user actions, including a simple "puff" upon the breath sensitive digital interface, the example is only for purpose of illustration, and does not necessarily represent any specific limitations of the present invention. Exemplary controls could include, for example, a slow (long) puff upward that displaces 3D elements further into the background; a slow (long) puff downward that displaces 3D elements closer to the foreground; a user action in which both actions above are combined with a left-to-right puff to control lateral displacement; and a fast (short) puff up or down that, combined with puff intensity or duration, may be used for extremely rapid zooming, also referred to herein as "swooping," while 3D navigation is enabled via directional sensing.

In combination with touch, the use of a breath sensitive digital interface such as those representative embodiments discussed above permits many implementations of a user interface to be achieved. For example, as mentioned above, the user may touch or grab a displayed element from a non-active, yet visible, layer or location, thanks to transparency and translucency of displayed elements in various layers/locations of the user interface, and puff to move it accordingly in 3D to a different layer/location. As described above, another implementation along the same concept may involve the user grabbing an element on the "active" layer, and then puffing to navigate in 3D before he/she drops the selected element in the appropriate layer.

FIGS. 6D-6F illustrate the use of an exemplary 3D user interface employing input from a breath-sensitive digital interface, in accordance with a representative embodiment of the present invention. FIG. 6D shows an exemplary user interface in which applications or content are represented as graphical objects 66d in a 3D environment presented in 2D on a display 65d, in which a representative embodiment of the present invention may be practiced. In the user interface of FIG. 6D, the size, color, or focus of the graphical objects of the user interface 66d may be used as a visual indicator showing the status of each of the graphical objects of user interface 66d as "active" or "not active," or in some representative embodiments, the priority of each application in receiving system resources such as, for example, the portion of processor computational resources or memory to be provided.

FIG. 6E illustrates both an oblique view and a top view of a user 60e engaged with a 3D user interface 66e that may correspond to the exemplary user interface 66d of FIG. 6D, in which applications or content are represented as graphical objects in a 3D environment presented in 2D on a display 65e, in accordance with a representative embodiment of the present invention. As in the user interface of FIG. 6D, the user interface of FIG. 6E, may use the size, color, or focus of the graphical objects of the user interface 66e as a visual indicator to show the status of each of the graphical objects of the user interface 66e as "active" or "not active," or in some representative embodiments, the priority of each application in receiving system resources such as, for example, the portion of processor computational resources or memory to be provided. In the oblique view of FIG. 6E, the user 60e directs exhaled breath 64e over, at, across, or upon a breath-sensitive digital interface (not shown), depending upon the "vocabulary" of the breath-sensitive digital interface and the user interface 66e. Elements of the breath-sensitive digital interface may, for example, be positioned near the mouth of the user 60e, between the user 60e and the display 65e, or along one or more edges of the display 65e. As more clearly shown in the top view of FIG. 6E, the user 60e is directing their exhaled breath right of center of the display 65e of FIG. 6E, resulting in some of the graphical objects of the user interface 66e shown in FIG. 6E being "blown out of sight." This may, for example, result from the graphical objects having been displaced farther to the right and off of the viewable area of the display 65e, or from the graphical objects having been displaced further away from the user 60e in the depth dimension of the user interface 66e.

FIG. 6F also illustrates an oblique view and a top view of a user 60f engaged with a 3D user interface 66f that may correspond to the exemplary user interfaces 66d, 66e of FIGS. 6D and 6E, in which applications or content are represented as graphical objects 66f in a 3D environment presented in 2D on a display 65f, in accordance with a representative embodiment of the present invention. As in the user interface of FIGS. 6D and 6E, the user interface of FIG. 6F, may use the size, color, or focus of the graphical objects of the user interface 66f as a visual indicator to show the status of each of the graphical objects of the user interface 66f as "active" or "not active," or in some representative embodiments, the priority of each application in receiving system resources such as, for example, the portion of processor computational resources or memory to be provided. In the oblique view of FIG. 6F, the user 60f directs exhaled breath 64f over, at, across, or upon a breath-sensitive digital interface (not shown), depending upon the "vocabulary" defined by the breath-sensitive digital interface and the user interface 66f. As in the illustration of FIG. 6E, elements of the breath-sensitive digital interface may, for example, be positioned near the mouth of the user 60f, between the user 60f and the display 65f, or along one or more edges of the display 65f. As more clearly shown in the top view of FIG. 6F, the user 60f is now directing their exhaled breath left of center of the display 65f of FIG. 6F, resulting in some of the remaining graphical objects of the user interface 66e shown in FIG. 6E, being "blown out of sight." In a manner similar to that of FIG. 6E, this may, for example, result from the graphical objects having been displaced farther to the left and off of the viewable area of the display 65f, or from the graphical objects having been displaced further away from the user 60f in the depth dimension of the user interface 66f.

Figure 6G:
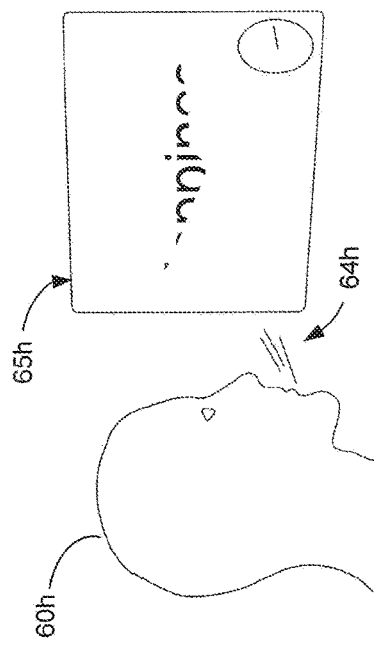
FIG. 6G shows a user exhaling breath over, at, across, or upon a breath-sensitive digital interface (not shown) to control the appearance of an image on a user interface shown on a display, in accordance with another exemplary embodiment of the present invention.

FIGS. 6G-6J illustrate an exemplary user interface employing input from a breath-sensitive digital interface, in accordance with a representative embodiment of the present invention. FIG. 6G shows a user 60g exhaling breath 64g over, at, across, or upon a breath-sensitive digital interface (not shown) to control the appearance of an image on a user interface 66g shown on a display 65g, in accordance with another exemplary embodiment of the present invention. A clock face is shown in the lower right corner of the display 65g solely to illustrate the duration of the user's exhaling of breath upon the breath-sensitive digital interface or, in some embodiments, to control the duration of inspiration/expiration from the user, for example, by not processing any input to the sensor while the user is being told to inhale, so as to force users into usages such as relaxation patterns, wellbeing exercises or games, for example. Such an indication to a user may play on various parameters such as, for example, lung capacity and flow control, and may be implemented as yoga- and/or chiqong-inspired methods, for example to help one to relax at his or her desk or while traveling, with a phone for example. Such an indication may, for example, be implemented in educational games for children, since controlled breathing exercises have been shown to improve concentration, IQ, and relaxation, and may also be implemented in combination with biofeedback devices which may provide additional input to a computerized platform, based on the measurement of blood pressure and other such data. At the point in time illustrated in FIG. 6G, only a small portion of the image has become visible.

Figure 6H:
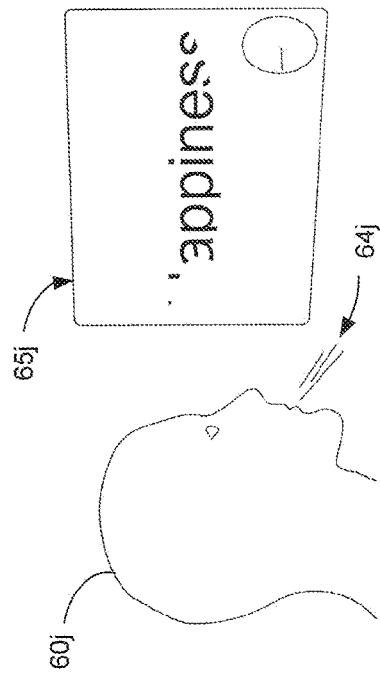
FIG. 6H shows a user continuing to exhale breath over, at, across, or upon a breath-sensitive digital interface (not shown) as input to control the appearance of an image on a user interface shown on a display that may correspond to, for example, the user breath, user interface, and display of FIG. 6G, respectively, in accordance with a representative embodiment of the present invention.

FIG. 6H shows a user 60h continuing to exhale breath 64h over, at, across, or upon a breath-sensitive digital interface (not shown) as input to control the appearance of an image on a user interface 66g shown on a display 65g that may correspond to, for example, the user breath 64g, user interface 66g, and display 65g of FIG. 6G, respectively, in accordance with a representative embodiment of the present invention. In the illustrations of FIGS. 6G-6J, the duration of the application of exhaled breath 64h upon a breath-sensitive digital interface is used as one property of the flow of breath of an element of the vocabulary understood as input to the user interface 66g-66j. Examples of properties of the flow of breath may include, for example, the direction, duration, volume, and pressure of the flow detected by the breath-sensitive digital interface. Again, the clock face shown in the lower right corner of the display 65h is used here solely to represent the duration of the user's exhaling of breath upon the breath-sensitive digital interface and may, in some embodiments, act to help control the duration of inspiration/expiration from the user, for example, as described above. As shown in FIG. 6H, continued application of the flow of exhaled breath 64h has resulted in an additional portion of the image being made visible.

Figure 6I:
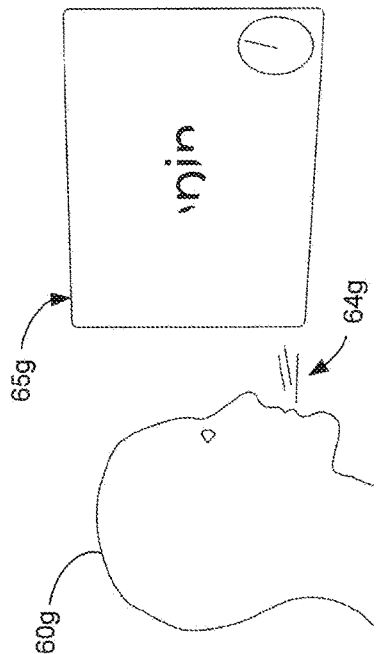
FIG. 6I illustrates a user stopping or interrupting the application of exhaled breath over, at, across, or upon the breath-sensitive digital interface used in FIGS. 6G and 6H, to allow the user to inhale, in accordance with a representative embodiment of the present invention.

FIG. 6I illustrates a user 60i stopping or interrupting the application of exhaled breath over, at, across, or upon the breath-sensitive digital interface used in FIGS. 6G and 6H, to allow the user 60i to inhale, in accordance with a representative embodiment of the present invention. In the situation depicted by FIG. 6I, the user interface 66i reacts to the lack of flow of breath over, across, at, or upon the breath-sensitive digital interface following a period of essentially continuous flow by recognizing the loss of flow as an acceptable interruption of user input, indicated by the notation "[inhale]" shown on display 65i, in accordance with a representative embodiment of the present invention. Characteristics or properties of the flow of breath such as, for example, a threshold or maximum level of flow, and a duration of flow below such a threshold, may be used to define an interruption of flow, and may be components of one or more elements of the user interface vocabulary interpreted or understood by the breath-sensitive digital interface, or by the application receiving signals, messages, or commands from the breath-sensitive digital interface. In various representative embodiments of the present invention, values or ranges of such properties or characteristics may be defined by the user 60i, by the manufacturer of the breath-sensitive digital interface, or by the developer of the system or software application receiving signals, messages, or commands from the breath-sensitive digital interface. In other representative embodiments of the present invention, analytical techniques or methods such as, for example, artificial intelligence or training sequences may be used to derive, quantify, and/or recognize such properties or characteristics.

Figure 6J:
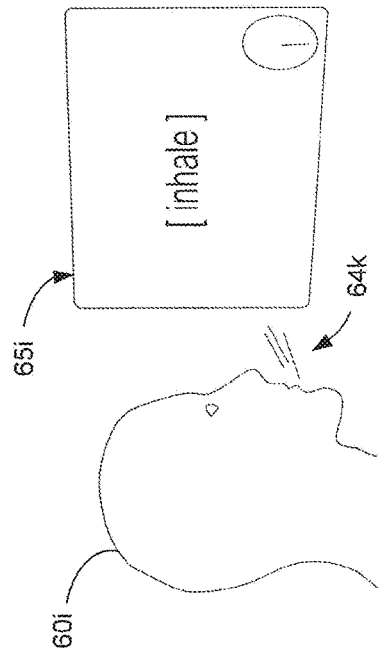
FIG. 6J illustrates a user again exhaling breath over, at, across, or upon a breath-sensitive digital interface (not shown), following the period of interruption of FIG. 6I, as continued input to control the appearance of an image on a user interface shown on a display that may correspond to, for example, the user breath, user interface, and display of FIG. 6h, respectively, in accordance with a representative embodiment of the present invention.

FIG. 6J illustrates a user 60j again exhaling breath 64j over, at, across, or upon a breath-sensitive digital interface (not shown), following the period of interruption of FIG. 6I, as continued input to control the appearance of an image on a user interface 66j shown on a display 65j that may correspond to, for example, the user 60h, breath 64h, user interface 66h, and display 65h of FIG. 6h, respectively, in accordance with a representative embodiment of the present invention. As described above, in the illustrations of FIGS. 6G-6J, the duration of the application of exhaled breath 64j upon a breath-sensitive digital interface may be used as one property of flow of an element of a vocabulary understood as input to the user interfaces 66g-66j of FIGS. 6G-6J. As in the previous examples of FIGS. 6G-6I, the clock face shown in the lower right corner of the display 65j is again used here solely to represent the duration of the user's exhaling of breath upon the breath-sensitive digital interface. As shown in FIG. 6J, the user 60j is again applying the flow of their exhaled breath 64j upon the breath-sensitive digital interface, resulting in an additional portion of the image being made visible. It should be noted that characteristics or properties of the flow of breath 64j such as, for example, a threshold or minimum level of flow, and a duration of above such a threshold, may define the end of an interruption, and may be components of an element of the user interface vocabulary understood by the breath-sensitive digital interface, or by the application receiving signals, messages, or commands from the breath-sensitive digital interface. In various representative embodiments of the present invention, values or ranges of such characteristics or properties may be defined by the user 60j, by the manufacturer of the breath-sensitive digital interface, or by the developer of the system or software application receiving signals, messages, or commands from the breath-sensitive digital interface. In other representative embodiments of the present invention, analytical techniques or methods such as, for example, artificial intelligence or training sequences may be used to derive, quantify, and/or recognize such characteristics.

Figures 7A, 7B:
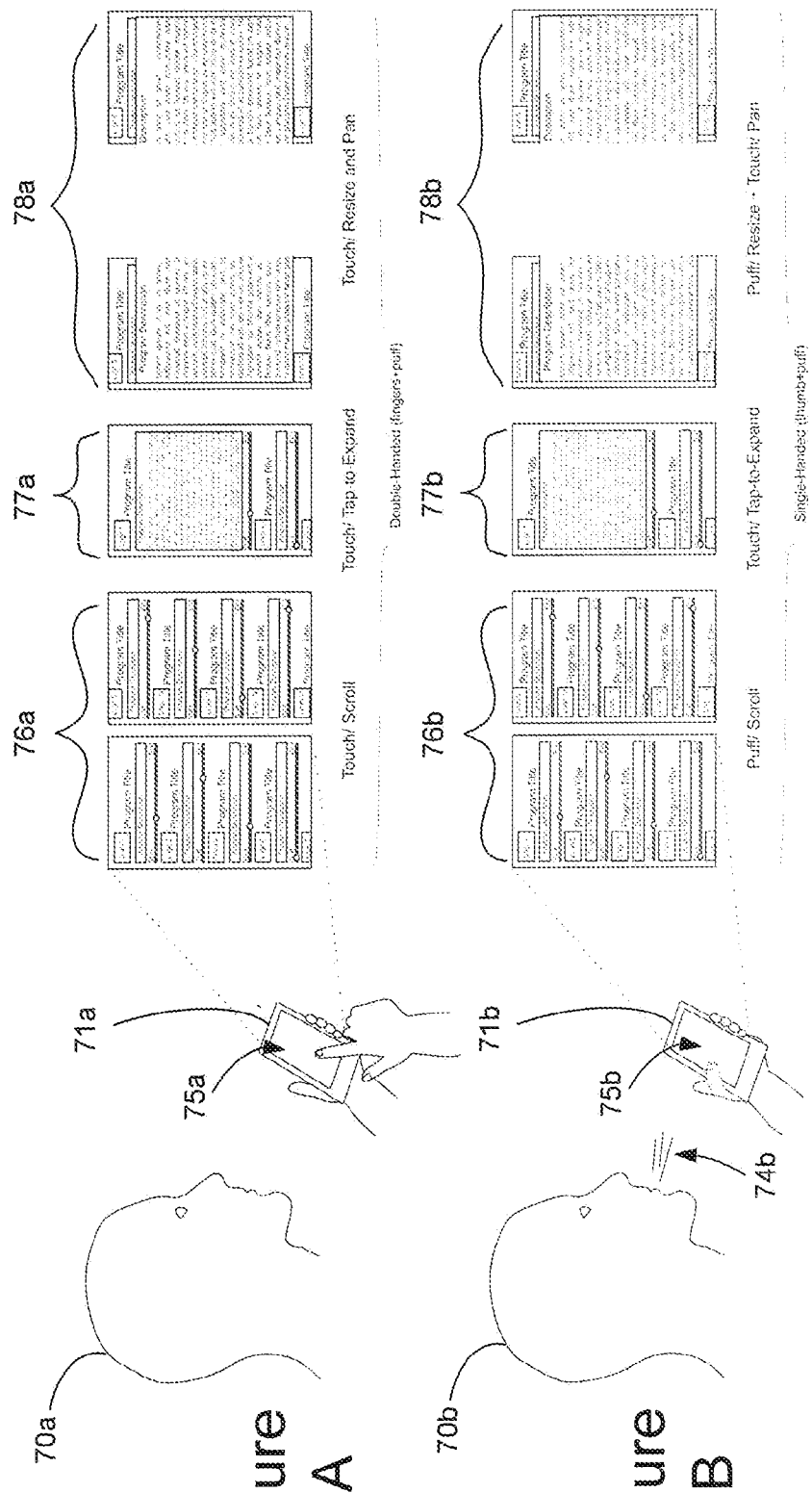
FIG. 7A illustrates a user interacting with an application using the touch-sensitive display of an electronic device such as, a smart phone, in which the user has both hands available as input for a user interface, in which a representative embodiment of the present invention may be practiced.
FIG. 7B illustrates another exemplary implementation of the application of FIG. 7A, in which a breath sensitive digital interface is employed as a form of input by a user to an electronic device, in accordance with a representative embodiment of the present invention.

FIG. 7A illustrates a user 70a interacting with an application using the touch-sensitive display 75a of an electronic device 71a such as, a smart phone, in which the user 70a has both hands available as input for a user interface, in which a representative embodiment of the present invention may be practiced. In the illustration of FIG. 7A, the display screen 75a of a smart phone 71a may include rich content such as, for example, a list of programs 76a of TV channels available for streaming on the smart phone 71a. The list 76a may include, for example, information such as a channel logo and a program title, and may be enabled with tap-to-expand capabilities to permit the user 70a to access additional channel information, program title, program description, start and end time, and a progress bar for a single entry of list 75a. The expanded information for a selected program may, for example, be shown on the display screen 75a of the smart phone 71a as expanded information 77a that fills the entire display screen 75a of the smart phone 71a. In the exemplary design illustrated in FIG. 7A, user functions such as, for example, scrolling the list of programs and resizing the display content (e.g., to make tiny fonts easier to read) may be performed using a "flick"/pan type touch input, expanding contextual information elements may be performed using a tap on the display screen 75a; and a program may be selected for playback by tapping on the program title. The resizing of display content may employ a windowing approach such as that of displayed content 78a, in which the user 70a may pan over a copy of the content shown as displayed content 77a that has been resized to enable easier viewing. In addition, the user interface of the electronic device 71a may support a "curtain effect" design (not shown) that may be enabled via touch control, so that the user 70a can pull down or sideways drag a bar on which topical information may be displayed, for example, to announce receipt of a new text or a news alert. This bar may be dragged by the user so that the message may be read in full, and may occupy the full screen.

Such an interface design typifies cases in which touch-based interaction is maxed out, thus yielding a high rate of unintentional inputs, and generating user frustration. In addition, it is heavily "double-handed" (i.e., it requires the use of both hands), which is especially difficult for users attempting to use such an interface on a mobile device, which are typically small and which may be used in situations where only one hand is available.

FIG. 7B illustrates another exemplary implementation of the application of FIG. 7A, in which a breath sensitive digital interface is employed as a form of input by a user 70b to an electronic device 71b, in accordance with a representative embodiment of the present invention. As illustrated in FIG. 7B, a representative embodiment of a user interface in accordance with the present invention may be designed to allow the user 70b to employ tapping of his or her fingers on a touch-sensitive interface of a display 75b only to select and expand displayed content, as illustrated by displayed content 77b, and may allow the use of his or her breath 74b upon a breath-sensitive digital interface (not shown) to scroll screen content. For example, the user 70b may puff across the sensor, which may be made up of one or more elements located along the edges or at one location on the face of the electronic device 71b. This exemplary employment of such a user interface may be experienced by the user 70b as puffing across the display screen 75b, either upward or downward, to scroll the displayed content in a corresponding upward or downward direction, as shown by display content 76b. The user 70b may also, for example, resize the content shown on the display screen 75b by puffing only toward one side of the display 75b to magnify the displayed content, and by puffing toward the other side of display 75b to shrink the displayed content. In one representative embodiment of the present invention, the entire screen may be magnified, or a selected portion of the display screen 75b may be designated by positioning a translucent frame over the content to be magnified. The user 70b may, for example, use puffing in combination with touching, in which the user 70b presses (i.e., not a brief tap) a finger upon the display screen 75b to indicate the point of touch to be the center of an area to be resized, and uses the duration of a puff of breath upon the breath-sensitive digital interface of the electronic device 71b to designate the amount or magnitude of the resizing of the displayed content, as illustrated by displayed content 78b. Further, the changes in various aspects of the user interface shown on display screen 75b may be proportional to properties of the flow of breath such as direction, duration, volume, and pressure upon the breath-sensitive digital interface of the electronic device 71b.

Notwithstanding the above, it should be noted that aspects of various representative embodiments of the present invention also enable fully single-handed, occlusion-free interaction in applications using a relatively small device (e.g., a smartphone). Mobile handheld devices in use today typically embed two kinds of input devices: touch screens, and side/edge buttons or sensors. These systems do not fully enable 3D interaction in an easy, intuitive, enjoyable manner.

Alternative solutions may include use of accelerometers or cameras to provide one more interaction controls in 2D or 3D environments. However, such systems may require the user to move and/or shake the handheld device, or to wave at the device, while adapting to ever changing light and contrast conditions, which may require substantial processing power to analyze or interpret user actions, may generate behavior acceptance issues, and may cause glare and other visibility problems. Other solutions may have the user push on the touch screen. Such solutions may be implemented by using contactors under the screen, which allow the user to squeeze the flanks of the handheld, or to wave a finger in front of an embedded, high-resolution camera. These systems remain potentially tedious and require the user to expend much energy moving his or her hands and fingers.

In such usage scenarios for 3D environments, direct interaction may also generate substantial occlusion of displayed content. The user may be required to use both hands (e.g., two hand touch, or a front-and-back-of-the-device type of interaction), or may require at least multi-finger, multi-touch interaction. Finger stretching on the surface of the display screen not only hides the displayed content, it also is limited in terms of speed and amplitude controls. Further, in many cases, the computing resources required by such systems to process these various inputs in real time may not match the power management requirements inherent to battery-powered devices.

In both direct and planned interaction designs, 3D user interface environments may be manipulated, for example, through interaction sequences that involve pointing, selecting, displacing, rotating, deforming, sizing, tilting, and may also involve changing elements of the user interface to be more or less transparent. Various representative embodiments of the present invention enable as many as six degrees of freedom, either in full or virtualized.

Various aspects of a representative embodiment of the present invention enable an intuitive, "fingers friendly," and occlusion-free 3D interaction, enhanced by suitable finger/hand interaction, and which may be combined with most existing input and control systems in multimodal designs. Puff-based interaction allows the control-to-display ratio to easily be tailored to any device in which a breath-sensitive digital interface or sensor of the present invention is embedded. In addition, one preferred embodiment of the present invention may employ touch-enabled areas, buttons, or other sensors placed on the outline of a display, to enable the user to employ combinations of fingers and breath (e.g., puffing) in an easy, non-obtrusive way, in either a single- or double-handed manner, with minimized occlusion of a display, and reduced unintentional or erroneous inputs. Various aspects of a representative embodiment of the present invention may be used to enable a user to, for example, move a virtual camera forward while simultaneously panning the virtual camera in very intuitive ways, whether combining, for example, finger strokes, taps, and/or swipes on a touch sensitive interface with puffs or directed streams of exhaled breath over, across, at, or upon a breath-sensitive digital interface as described herein.

Figure 8B:
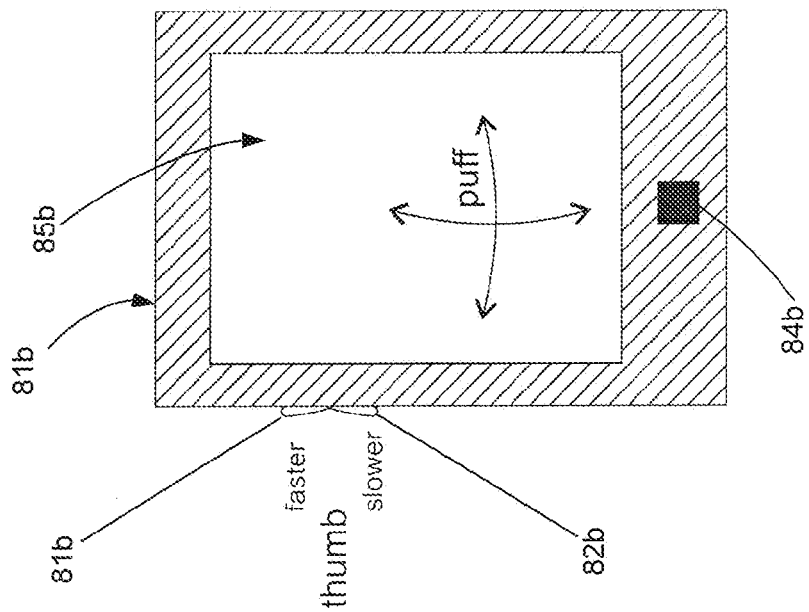
FIG. 8B illustrates another exemplary implementation of an electronic device having a display and an integrated breath-sensitive digital interface that may correspond to, for example, the display and breath-sensitive digital interface of FIG. 8A, respectively, in accordance with a representative embodiment of the present invention.
Figure 8A:
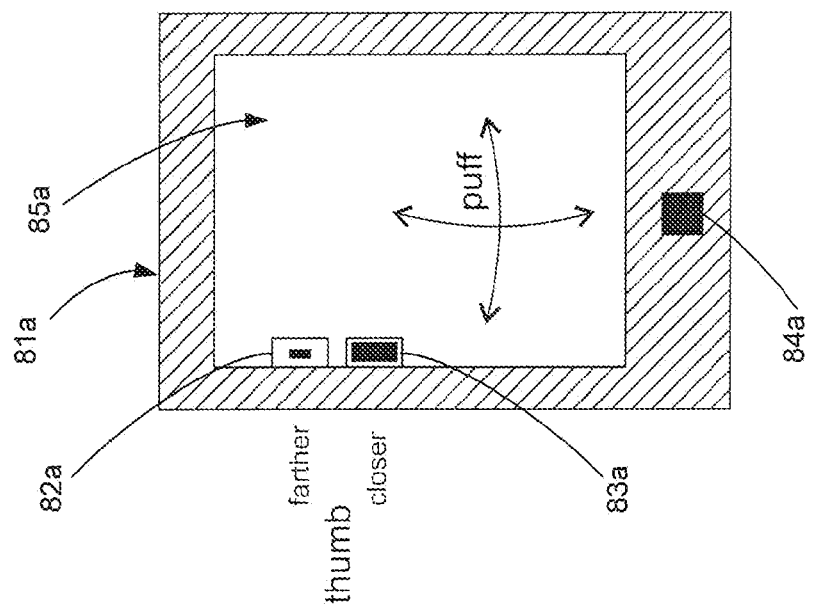
FIG. 8A illustrates an exemplary implementation of an electronic device having a display with a touch sensitive interface, and an integrated breath-sensitive digital interface, in accordance with a representative embodiment of the present invention.

FIGS. 8A and 8B illustrate additional exemplary implementations of user interfaces employing a breath-sensitive digital interface, in accordance with representative embodiments of the present invention. FIG. 8A illustrates an exemplary implementation of an electronic device 81a having a display 85a with a touch sensitive interface, and an integrated breath-sensitive digital interface 84a, in accordance with a representative embodiment of the present invention. It should be noted that the arrangement of the elements of FIG. 8A are not necessarily specific limitations of the present invention, as there are numerous configurations and applications that may be in accordance with aspects of representative embodiments of the present invention. For example, as shown in FIG. 8A, one could arrange a user interface of the electronic device 81a to make use of one or more regions, such as the graphical objects or elements of the "farther" region 82a and the "closer" region 83a of the viewable area of the display 85a, to act as an actuating device for zooming in or out using, for example, a thumb of a hand. The user interface of the electronic device 81a may then use puffs or streams of breath to control the rotation of a sphere-based, or any other 3D environment in a smooth, fluid, and intuitive manner. Similar applications could be configured using a variety of buttons, sensors switches, etc., to control or adjust practically any function. Moreover, a number of features such as, for example, "Look Around," "Inside-the-Sphere," and multidimensional carousel may be enabled via puffs alone. Other actions may be completed using just one finger, which may be enabled to, for example, define a reference point (i.e., a planned interaction) or finely control speed, and yet remain free to tap, select, or engage touch-enabled controls.

FIG. 8B illustrates another exemplary implementation of an electronic device 81b having a display 85b and an integrated breath-sensitive digital interface 84b that may correspond to, for example, the display 85a and breath sensitive digital interface 84a of FIG. 8A, respectively, in accordance with a representative embodiment of the present invention. The electronic device 81b of FIG. 8B is similar in many respects to the electronic device 81a of FIG. 8A, but is instead implemented using mechanical switches or buttons 82b, 83b in place of the "farther" region 82a and the "closer" region 83a of the viewable area of the display 85a, to permit the user to zoom in or out using, for example, a thumb of a hand.

Figure 9A:
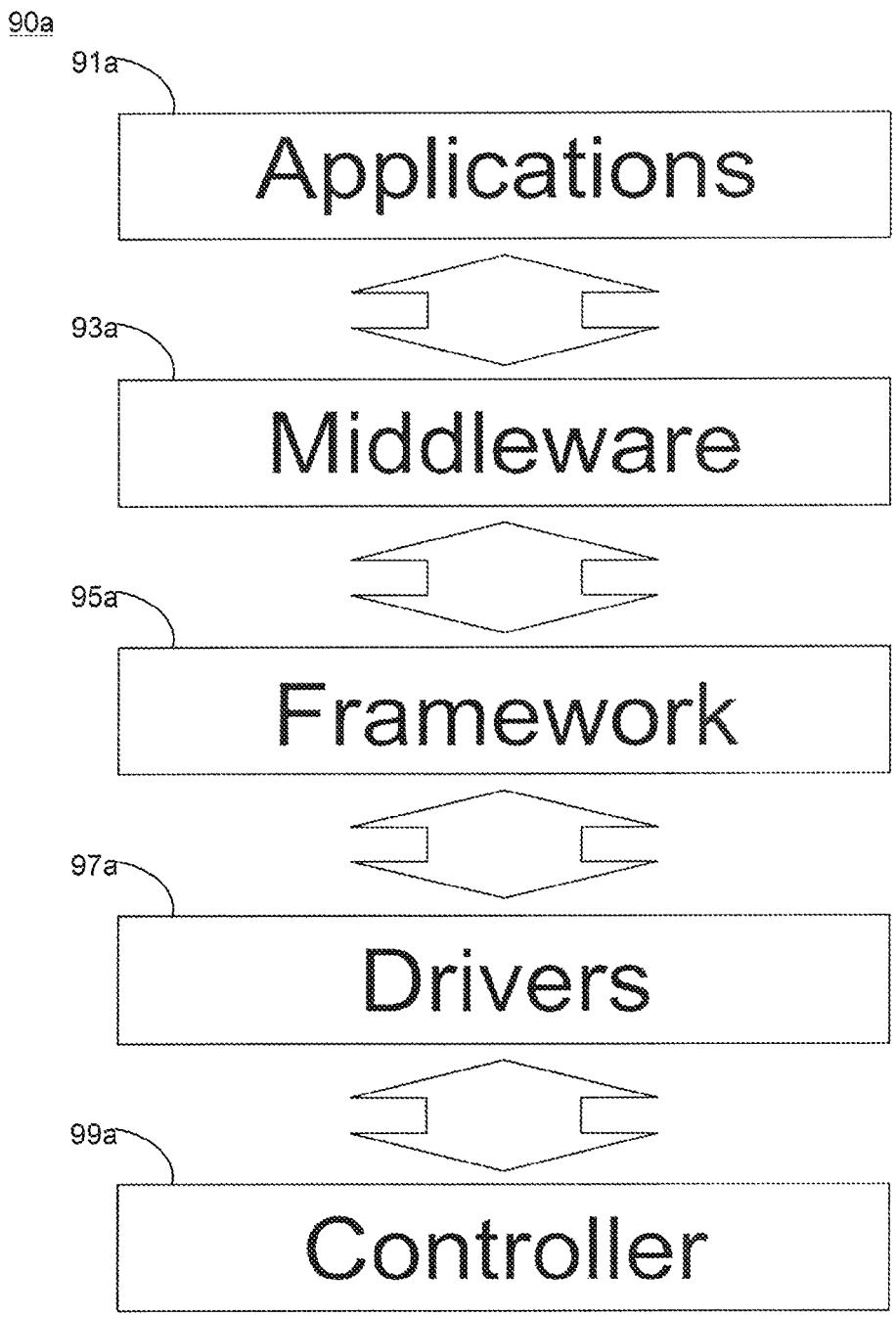
FIG. 9A is an illustration of a software "stack" showing the software entities and software/communications interfaces that may be used to interface between software applications and a controller of a breath-sensitive digital interface, in accordance with a representative embodiment of the present invention.

FIG. 9A is an illustration of an exemplary software "stack" 90a showing the software entities and software/communications interfaces that may be used to interface between software applications 91a and a controller 99a of a breath-sensitive digital interface, in accordance with a representative embodiment of the present invention. The software stack 90a of FIG. 9A includes the software/firmware of a controller 99a used to analyze signals from elements of a breath sensitive digital interface sensor device, such as that described in U.S. Provisional Patent Application No. 61/436,506, entitled "Breath Sensitive Digital Interface," filed Jan. 26, 2011, U.S. Provisional Patent Application No. 61/431,716, entitled "MEMS/MOEMS Sensor Design," filed Jan. 11, 2011, and U.S. patent application Ser. No. 12/055,999, entitled "Method And System For A MEMS Detector That Enables Control Of A Device Using Human Breath," filed Mar. 26, 2008, and U.S. patent application Ser. No. 13/348,537, entitled "MEMS/MOEMS Sensor Design," filed Jan. 11, 2012, the complete subject matter of each of which is hereby incorporated by reference, in its respective entirety. The software stack 90a also includes middleware 93a that permits the software applications 91a to operate within the environment provided by an operating system framework 95a. The framework 95a interfaces with drivers 97a, which are hardware-cognizant software/firmware routines customized to permit the framework 95a to communicate data and control information to and from the controller 99a.

Figure 9B:
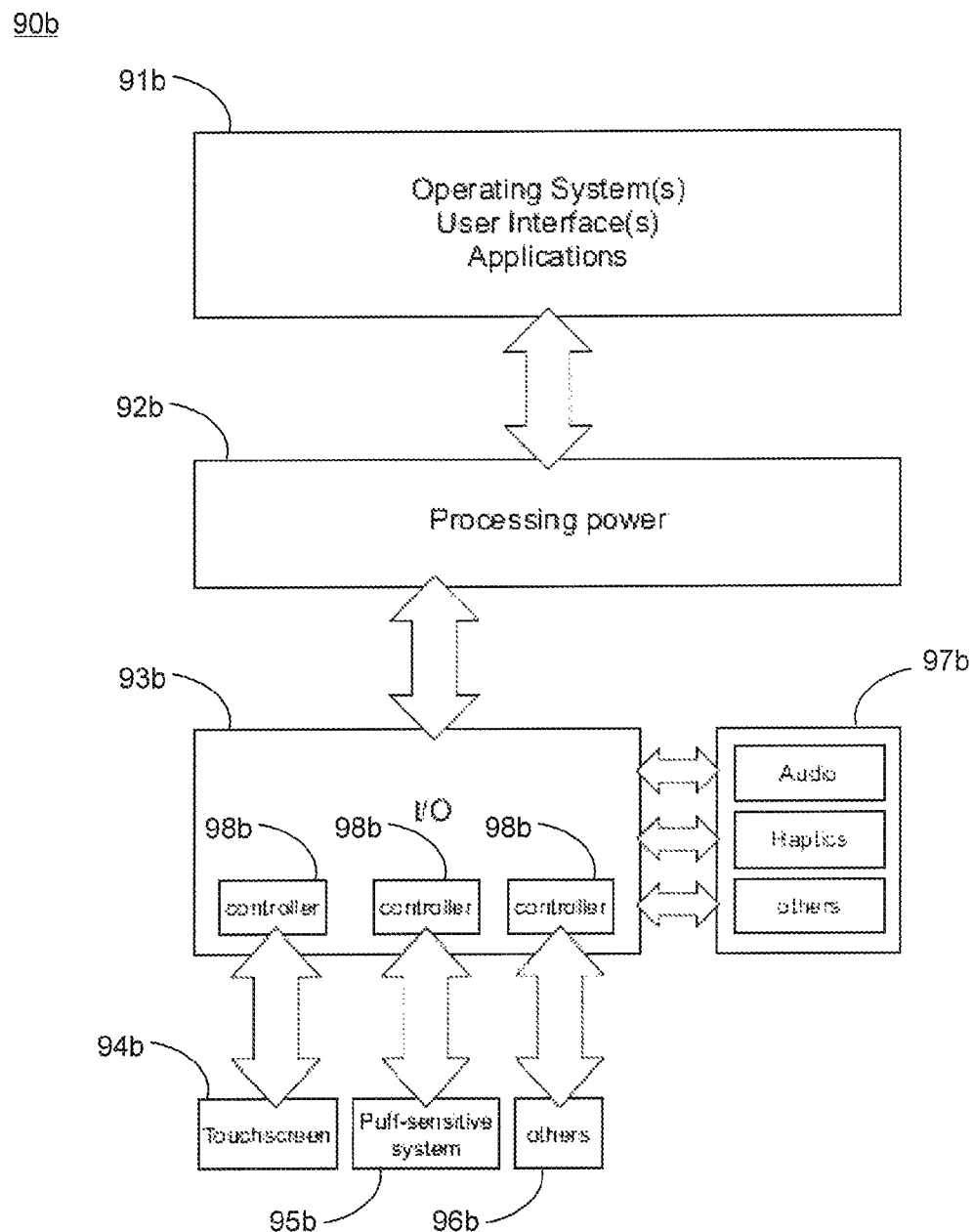
FIG. 9B is a block diagram illustrating the elements of an exemplary host system including a puff- or breath-sensitive system, in accordance with a representative embodiment of the present invention.

FIG. 9B is a block diagram illustrating the elements of an exemplary host system 90b including a puff- or breath-sensitive system 95b, in accordance with a representative embodiment of the present invention. As illustrated in FIG. 9B, the host system 90b comprises computer-readable medium 91b in which is stored executable code that performs the functions of, for example, operating system(s) (OSs), user interface(s) (UIs), and application(s). Processing power 92b such as, for example, a processor/microprocessor is electrically coupled to the computer-readable medium 91b and to one or more suitable microcontroller(s) that may be used to realize an input/output (I/O) subsystem 93b, which comprises a number of input/output controllers 98b and other electronic components used to receive and send signals from and to various input/output devices. The input/output (I/O) controllers 98b and circuitry of the I/O subsystem 93b send and receive signals to and from input systems such as a touch screen 94b, a puff- or breath-sensitive system 95b, and other devices 96b. The input/output subsystem 93b converts data signals to and from suitable data communication formats (e.g., I2C, UART, USB, among others), and also outputs signals through subsystem 97b to devices such as an audio output device (e.g., speakers) and haptic systems for providing haptic (e.g., related to touch and physical) feedback to a user. The host system 90b also includes power circuitry (not shown). The I/O subsystem 93b supports communications circuitry, including radio frequency (RF) communication systems, memory and storage subsystems, as well as codecs to permit the overall functioning of the host device in which the host system 90b is embodied. The I/O controllers 98b of I/O subsystem 93b and the processing power 92b may also enable additional features such as, for example, biometric sensors, that may complement the touch screen 94b, puff- or breath-sensitive system 95b, and other interfaces 96b, to allow the host system 90b to adapt puff-based interaction to a given user and his/her personal traits.

Figure 10:
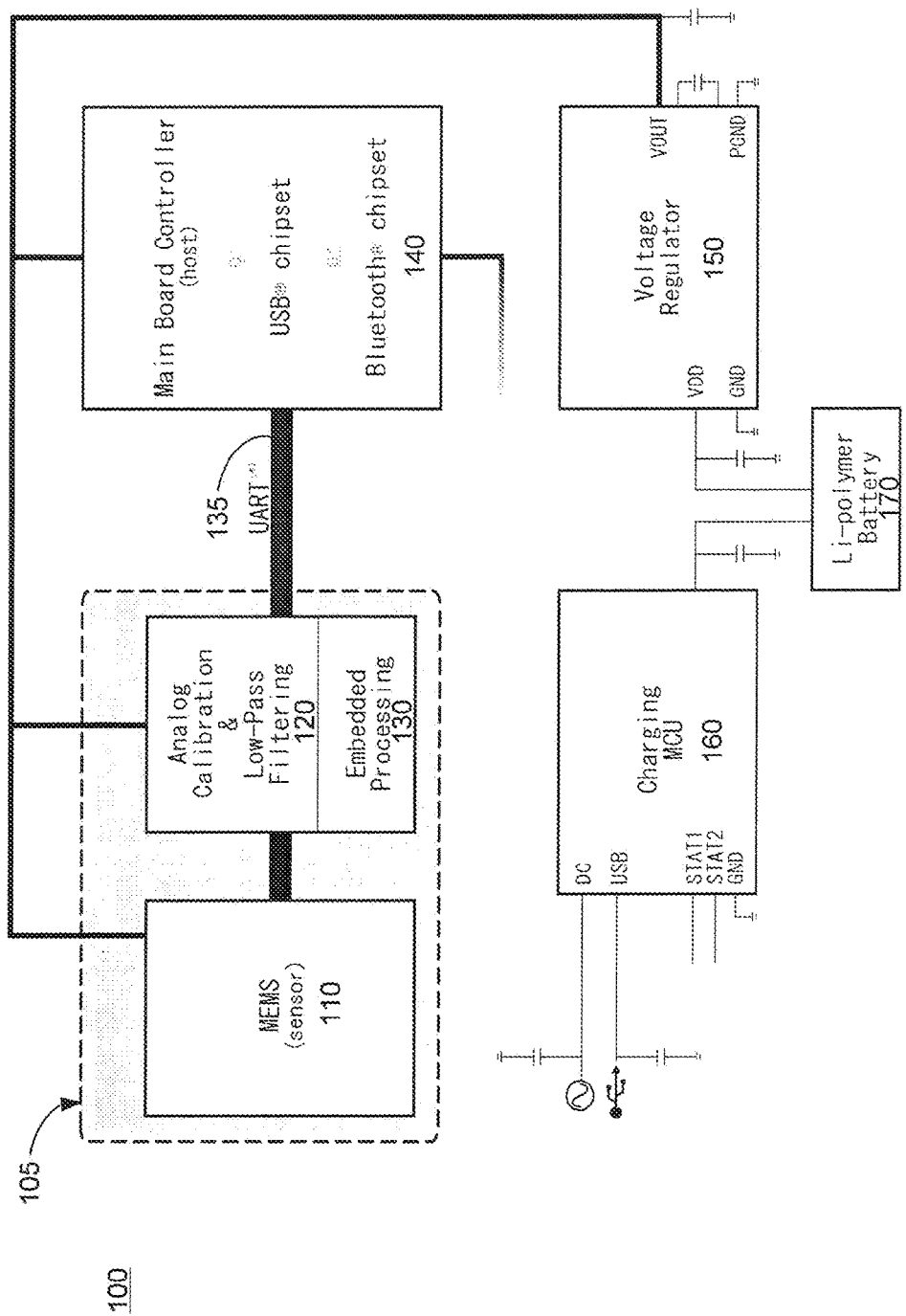
FIG. 10 is an illustration of a block diagram of an exemplary system including a breath-sensitive digital interface device connected via a serial communication link to a host device, in accordance with a representative embodiment of the present invention.

FIG. 10 is an illustration of a block diagram of an exemplary system 100 including a breath-sensitive digital interface device 105 connected via a serial communication link 135 to a host device 140, in accordance with a representative embodiment of the present invention. As shown in FIG. 10, the system 100 includes the breath-sensitive digital interface 105, a host controller device 140, a battery 170, a battery charging circuit 160, and a voltage regulator 150.

The breath-sensitive digital interface 105 includes a micro-electromechanical system (MEMS) sensor 110, which may be, for example, a MEMS sensor such as those described in U.S. Provisional Patent Application No. 61/431,716, entitled "MEMS/MOEMS Sensor Design," filed Jan. 11, 2011, and U.S. patent application Ser. No. 12/055,999, entitled "Method And System For A MEMS Detector That Enables Control Of A Device Using Human Breath," filed Mar. 26, 2008, and U.S. patent application Ser. No. 13/348,537, entitled "MEMS/MOEMS Sensor Design," filed Jan. 11, 2012, the complete subject matter of each of which is hereby incorporated by reference, in its respective entirety. The breath-sensitive digital interface 105 also includes functionality, in software and/or hardware, to perform analog calibration 120 and low-pass filtering 130. The breath-sensitive digital interface 105 of FIG. 10 communicates data and commands with the host device 140 using an asynchronous serial communication protocol 135 compatible with industry standard universal asynchronous receiver/transmitter (UART) devices.

In the system 100 of FIG. 10, the host device 140 communicates with the breath-sensitive digital interface 105 using an asynchronous serial communication protocol 135. It should be noted that the use of an asynchronous serial protocol does not necessarily represent a specific limitation of the present invention, in that other means of communication may be used. The host device 140 of the system 100 may also include a chipset supporting the Universal Serial Bus (USB) protocol or Bluetooth® chipset to provide wireless connectivity, to permit communication with other devices such as, for example, a personal computer, smart phone, or other suitable device.

The battery 170 of the system 100 provides power for the system 100 when not available from other sources such as, for example, a USB connection and may, for example, store energy using a lithium polymer or other suitable chemistry. Regulation of the supply voltage for the breath-sensitive digital interface 105 and the host controller 140 from the level provided by the battery 170 or other source is provided by the voltage regulator 150. The battery 170 may be charged from a main power source or from the direct current available from a USB interface used to communicate with an interconnected personal computer, smart phone, or other suitable device. In some representative embodiments of the present invention, the MEMS sensor 110 of the breath sensitive digital interface 105 may be set to "idle mode" upon not receiving a valid input signal for a preset duration. When in "idle mode," the MEMS sensor 110 may be power-cycled at a low-frequency, and may be set to "fully functional mode" upon receiving a valid input signal. In addition, in some representative embodiments of the MEMS sensor 110 in which the sensor is optical in nature, ambient light may be allowed to complement light source(s) within the MEMS sensor 110, to reduce the amount of energy that is needed from the battery 170 or from other source of power in the system 100. It should be noted that the elements shown in FIG. 10 are presented for reasons of illustration and example, and should not be interpreted as a limitation, in that a breath-sensitive digital interface may be arranged within circuits in which functions described above are assembled in different combinations and re-arrangements.

Figure 11:
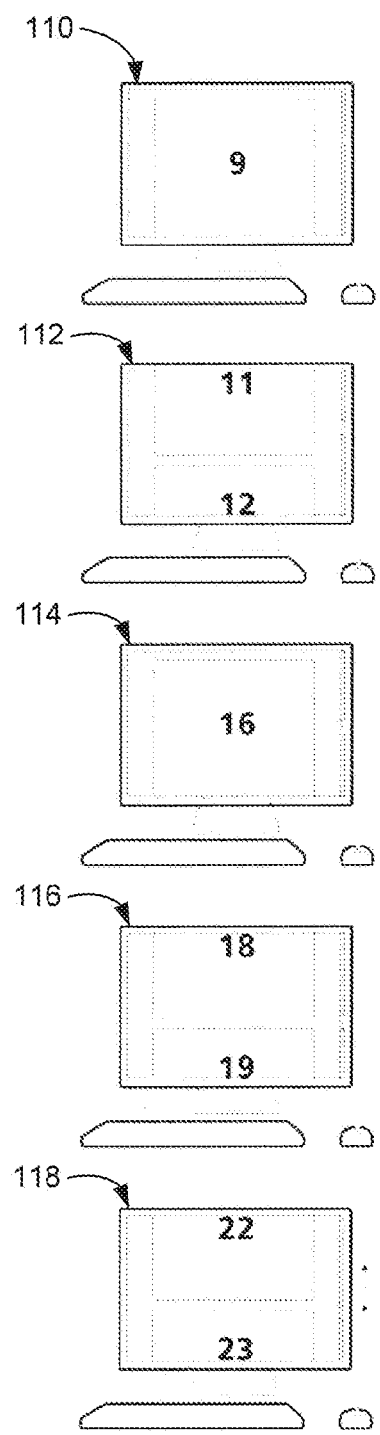
FIG. 11 shows a sequence of screens that illustrate the scrolling through portions of content using, for example, a conventional scroll-wheel. Repetitive stress known as "scrolling finger fatigue" mostly results from repeated "rolling" of the scroll wheel while browsing long documents, as illustrated in FIG. 11.

FIG. 11 shows a sequence of screens 110-118 that illustrate the scrolling through portions of content using, for example, a conventional scroll-wheel. Repetitive stress known as "scrolling finger fatigue" mostly results from repeated "rolling" of the scroll wheel while browsing long documents, as illustrated in FIG. 11.

Figure 12:
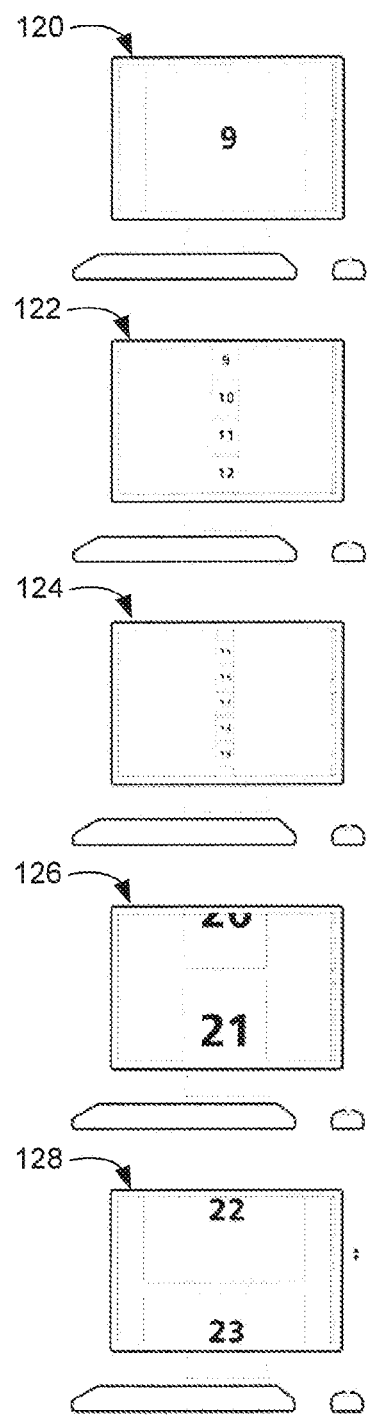
FIG. 12 shows a sequence of screens that illustrates the use of an exemplary user interface that reduces recourse to repeated manipulation of a scroll-wheel resulting from efficient zoom-out, in accordance with a representative embodiment of the present invention.

FIG. 12 shows a sequence of screens 120-128 that illustrates the use of an exemplary user interface that reduces recourse to repeated manipulation of a scroll-wheel resulting from efficient zoom-out, in accordance with a representative embodiment of the present invention.

Some representative embodiments of the present invention may involve the user positioning a handheld device such as, for example, a cellular telephone, closer in front of his or her mouth to interact rather than, for example, positioning the handheld device to allow double-handed usage. That is, at a distance when bringing the handheld device closer to his or her other hand, when the second hand is not fully available because the user is, for example, holding onto a handrail or carrying a briefcase, or to prevent glare reflections in daylight or other contexts. Planned interaction, in which a user "pushes" or "pulls" a device (e.g., a virtual camera) to or from a reference point, represents another mode of user interaction in which 3D interaction using conventional tactile user interfaces may be too cluttered and/or obstructed.

Representative embodiments of the present invention may also utilize "Artificial Intelligence" features that monitor, track, and/or adapt processing based on the user's behavior. For example, one representative embodiment of the present invention may include ways to store present and past output values and unintentional actions of "errors," as well as a means to calculate and analyze this information, so as to adapt to the current circumstances and user scenarios such as, for example, the distance between the user and the breath-sensitive digital interface (i.e., sensor), typical puff intensity, airflow displacement speed across the stressable area, and environmental conditions. This information helps provide for more accurate use of breath in control of a user interface, while assisting in predicting future user behaviors.

Other aspects of a representative embodiment of the present invention may be seen in graphical user interfaces where a user sees the user interface through a "virtual camera," and has the ability to move and/or zoom in and out on the user interface, independent of the control interaction. In such an arrangement, one mode of user interaction, whether touch- or gesture-based, may be highly prone to errors and therefore frustrating. The breath-sensitive interface in accordance with aspects of the present invention may be used to better implement the "curtain effect" in mobile devices, where the user may be required to drag from the edge of the display in order to quickly access or update a setting, contextual menu, new mail or text, or social network update. Such acts, as well as a variety of other contextual, pop-in, slide-over, and other design forms aimed at instant access to information without the need to navigate the whole UI back to "Home", whether to access, for example, a new message, weather conditions, or a flight time, typically yield a high rate of missed "pull downs" or unintentional taps/selects on icons or hyperlinks while dragging the "curtain."

Developers skilled in user interface development using Adobe® Flash®, hypertext markup language version 5 (HTML 5), cascading style sheets (CSS), or certain operating systems (e.g., Android) may leverage both the design and control toolkits provided under these development environments, and any human interface design (HID) stacks and libraries enabled via the host system and attached operating system, to develop user interfaces based on puff-interaction to control 2- and 3-D vector animations and multimedia files, in accordance with aspects of the present invention.

Moreover, dedicated drivers may help improve/optimize and simplify how a representative embodiment of the present invention interacts with a given system. Existing drivers may also be leveraged to enable connection to any system via existing protocols such as, for example, Universal Serial Bus (USB), Thunderbolt™, asynchronous character protocols using a universal asynchronous receiver/transmitter (UART), and Bluetooth®. Specific drivers may also be used to better translate interaction features proper to puff-based input devices by combining high-level, device-generic commands such as, for example, those shared with a mouse or a touch screen, and specific commands. Also, the firmware embedded in the breath-sensitive digital interface or sensor may be customized, for example, to better adapt to existing drivers in highly proprietary environments.

It should also be noted that a representative embodiment of the present invention may be employed in devices without visual output, for instance where the output is audio only. In such instances, a representative embodiment of the present invention may be used, for example, to set a volume level or to skip tracks in a podcast or a music player. Representative embodiments of the present invention may be used in systems that provide output to a user through only haptics such as, for example, in in-vehicle applications where the driver's attention must be kept on the road and where he or she will puff and receive a haptics feedback such as, for example, steering wheel vibration or seat vibration, to name only two possibilities.

It should be noted that graphical user interfaces (e.g., Microsoft Windows®) enable several ways of controlling zoom-in and zoom-out functionality. Such means include clicking on icons, displacing a cursor/slider, holding down a "modifier"/shortcut key while scrolling with a mouse wheel, typing a zoom factor, as well as, in touch-enabled systems, "pinching-and-stretching" or double tapping the content to resize it. Applications may implement specific resizing features (e.g., Google Earth©: "Hold down the right-mouse button. Move your mouse down to zoom in or up to zoom out"). These methods and devices are often uneasy to control, have limited magnitude, remain difficult to memorize and integrate into the interaction flow, and do not meet current digital users' requirements (e.g., regarding social media, images, maps, etc.). Efficient zooming device should not put any more workload on the hands of users, but instead should be intuitive and provide zoom-and-pan functionality.

A representative embodiment of the present invention enables users to blow up pictures, spreadsheets, maps, any content, in a very metaphoric way. In one representative embodiment and, thanks to advanced content size control algorithms, the velocity and duration of the puff toward a sensor device as described herein may be interpreted to determine the resizing range to render, while the upward/ "clockwise" motion of a virtual pinwheel paradigm may result in a zoom-in interaction, and vice-versa. Likewise, the user may puff across a sensor device in accordance with a representative embodiment of the present invention in a lateral manner to pan/flick content. Other options include aiming-point and fit-to-window (i.e., reset to full screen), for example. Content navigation may involve efficient zooming solutions so that users can easily increase content size to a comfortable view.

Several studies have been focusing on the topic of graphical user interface complexity. Igarashi and Hinckley have shown that existing scrolling methods generate complexity, disorientation, and extra operational time since users must coordinate several parameters to adjust the scroll interaction (e.g., scroll cursor position, scrollbar displacement speed, and the content itself.). Cockburn and Savage have studied the impact of zoom level on scroll distance (e.g., more scrolling needed when zoomed-in, less when zoomed-out to achieve the same amount of content navigation). For the user's benefit, scrolling and zooming should be easily combined. They cannot be, however, in currently implemented methods since the same device is typically used for both scrolling and zooming, which in addition may generate content occlusion in the case of touch-enabled systems). Significant productivity gains may be achieved by enabling users to zoom-out to reduce scrolling interaction and increase browsing immediacy. Further efficiency may result from an easy panning method so that users may fully manipulate content, even at high magnification levels. Various representative embodiments of the present invention overcome these shortcomings of conventional user interface devices.

In a representative of the present invention, a user may, for example, zoom in by puffing upward, zoom out by puffing downward, and pan by puffing left-to-right, all while the user may still scroll using a scroll-wheel of a mouse, yet with a tremendously reduced number spins of the scroll-wheel, in that the user may zoom easily and with high magnitude, in which scrolling 10 pages is no more than a few millimeters of spinning the scroll-wheel. In a representative embodiment of the present invention, such simple functions are achieved with the breath sensor even at a substantial distance from the mouth of the user. Further, the rendering of such zooming is what is referred to herein as "swoop", in that it is a very significant departure from current zooming techniques. A representative embodiment of the present invention provides the ability to resize the scrolled content simultaneous with scrolling, so that a user scrolls less, and gets a better understanding of where they are within long documents, Web pages, and the like.

Aspects of the present invention may be seen in a system for use in an electronic device. Such a system may comprise at least one processor, where the at least one processor may be communicatively coupled to a first device for receiving manual input from a user and to a second device for receiving input from a user by detecting a flow of human breath of the user, where the at least one processor concurrently employs user input from the first device and the second device to control a graphical user interface on a display. The second device may comprise a micro-electromechanical system for detecting the flow of human breath in open space, and the second device may comprise circuitry for analyzing at least one characteristic of the flow of human breath. The at least one characteristic may comprise a level of flow of human breath, and the at least one characteristic may comprise a duration of flow of human breath.

In a representative embodiment of the present invention, the circuitry may detect elements of a user interface vocabulary in the flow of human breath, and may send representations of the detected elements to the at least one processor, where each element comprises a predefined pattern of one or more of level of flow, duration of flow, and movement of flow direction across the second device. A threshold of the at least one characteristic may be defined by the user. The first device may comprise a computer mouse, and the graphical user interface may represent a three dimensional space. The graphical user interface may comprise two or more layers, each layer comprising one or more graphical objects, and the at least one processor may move one or more graphical objects on the display in response to user input from the second device. In a representative embodiment of the present invention, the movement may be proportional to a property of the flow, and the at least one processor may indicate selection of one or more graphical objects on the display in response to user input from the second device. Each of the one or more graphical objects may be representative of one of a software application and digital content of a user.

Further aspects of the present invention may be found in a method for manipulating digital information on a device. Such a method may comprise aligning information in multiple different layers on a display of the device, including at least a first layer and a second layer. The method may also comprise receiving input from the user via a first user interface of the device for controlling information contained on the first layer, and concurrently receiving input from the user via a second user interface of the device for controlling information on the second layer. The first user interface may comprise using touch or gesture based input of the user, and the second user input may comprise using breath of the user.

Additional aspects of the present invention may be seen in a method for manipulating digital information via a user interface. Such a method may comprise receiving input from the user via a manual first control means, concurrently receiving input from the user via a second control means that detects flow of breath of the user, and positioning information within a two dimensional representation of a three dimensional graphical user interface using input received via the first control means and the second control means. The first control means may comprise touch or gesture-based input techniques, and the second control means may comprise a micro-electromechanical system, and communicates user input as elements of a user interface vocabulary, where each element may comprise a predefined pattern of one or more of level of flow, duration of flow, and movement of flow direction across the micro-electromechanical system.

Although devices, methods, and systems according to the present invention may have been described in connection with a preferred embodiment, it is not intended to be limited to the specific form set forth herein, but on the contrary, it is intended to cover such alternative, modifications, and equivalents, as can be reasonably included within the scope of the invention as defined by this disclosure and appended diagrams.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system for use in an electronic device, the system comprising:
    at least one processor operatively coupled to a display device and configured to receive input from a user via a first input device accepting a tactual mode of user input and to receive input from the user via a second input device accepting a breath mode of user input; and
    wherein the at least one processor concurrently employs user input from only one of the first input device and the second input device to enable user selection of a particular group of graphical elements of a plurality of groups of graphical elements of a graphical user interface visible on the display device as a currently active group of graphical elements and employs user input only from the other of the first input device and the second input device to enable user selection and control of a graphical element from the currently active group of graphical elements, to control the electronic device using the graphical user interface on the display device, wherein the second input device comprises a microelectromechanical system for detecting the flow of human breath in open space, wherein the second input device is external to the user, wherein the second input device is not physically in contact with the mouth of the user, and wherein the flow of human breath between the user and the second input device is not controlled by use of a physical channel.

2. The system according to claim 1, wherein the second input device comprises circuitry for analyzing at least one characteristic of the flow of human breath.

3. The system according to claim 2, wherein the at least one characteristic comprises a level of flow of human breath.

4. The system according to claim 2, wherein the at least one characteristic comprises a direction of sweeping of the flow of human breath across a breath sensor of the second input device.

5. The system according to claim 2, wherein the circuitry:
    detects elements of a user interface vocabulary in the flow of human breath; and
    sends representations of the detected elements to the at least one processor.

6. The system according to claim 5, wherein each element comprises a predefined pattern of one or more of level of flow, duration of flow, and movement of flow direction across the second input device.

7. The system according to claim 2, wherein a threshold of the at least one characteristic is defined by the user, and wherein a mapping of a mode of user input that enables user selection of a particular group of graphical elements and a mode of user input that enables user selection and control of a graphical element from the currently active group of graphical elements, is configurable.

8. The system according to claim 1, wherein the first input device comprises a computer mouse.

9. The system according to claim 1, wherein the graphical user interface represents a three dimensional space.

10. The system according to claim 1, wherein the graphical user interface comprises two or more layers, each layer comprising one or more graphical objects.

11. The system according to claim 1, wherein the at least one processor moves one or more graphical elements of the graphical user interface on the display device in response to user input from the second device.

12. The system according to claim 11, wherein the movement is proportional to a property of the flow.

13. The system according to claim 1, wherein the at least one processor indicates selection of one or more graphical elements on the display device in response to user input from one of the first input device and the second input device.

14. The system according to claim 1, wherein each of the graphical elements is representative of one of a software application and digital content of a user.

15. A method for managing digital information on a device, the method comprising:
    aligning information in multiple different layers of a graphical user interface on a display of the device;
    receiving a first user input in the form of a first mode of user input selected from one of a tactual mode of input and a breath mode of input, the first user input only for controlling information contained on a particular layer of the multiple different layers;
    concurrent with receiving the first user input, receiving a second user input in the form of a second mode of user input different from the first mode and selected from one of the tactual mode of input and the breath mode of input, the second user input only for navigating among the multiple different layers to identify the particular layer; and
    wherein a mapping of the tactual mode of input and the breath mode of input to the controlling and the navigating is configurable, and
    wherein receiving the breath mode of user input comprises detecting a flow of human breath of the user without contact with the user, and wherein the flow of human breath from the user is not directed by a physical channel.

16. The method of claim 15, wherein the first user interface comprises using touch or gesture based input of the user.

17. A method for manipulating digital information via a user interface, the method comprising:
    receiving input from the user via a tactual first control means;
    concurrently receiving input from the user via a second control means that detects flow of breath of the user without contact with the user and wherein the flow of human breath from the user is not controlled by a physical channel;

selecting a particular graphical display element within a two dimensional representation of a three dimensional graphical user interface using input received via only the first control means; and moving a user view towards a foreground or a background of the three dimensional graphical user interface only according to the flow of breath detected by the second control means.

18. The method of claim 17, wherein the first control means comprises touch or gesture-based input techniques.

19. The method of claim 17, wherein the second control means comprises a micro-electromechanical system, and communicates user input as elements of a user interface vocabulary, each element comprising a predefined pattern of a level of flow, a duration of flow, and a movement of flow direction across the micro-electromechanical system.

* * * * *